(12) United States Patent
Matsunaga et al.

(10) Patent No.: US 10,930,150 B2
(45) Date of Patent: Feb. 23, 2021

(54) PARKING SUPPORT APPARATUS

(71) Applicant: TOYOTA JIDOSHA KABUSHIKI KAISHA, Toyota (JP)

(72) Inventors: Yasutaka Matsunaga, Nisshin (JP); Yu Hiei, Toyota (JP); Yuusuke Nomura, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/673,226

(22) Filed: Nov. 4, 2019

(65) Prior Publication Data

US 2020/0242936 A1 Jul. 30, 2020

(30) Foreign Application Priority Data

Jan. 25, 2019 (JP) .............................. JP2019-011068

(51) Int. Cl.
*G08G 1/14* (2006.01)
*G06K 9/00* (2006.01)
*H04L 12/40* (2006.01)

(52) U.S. Cl.
CPC ......... *G08G 1/146* (2013.01); *G06K 9/00805* (2013.01); *G06K 9/00812* (2013.01); *G08G 1/149* (2013.01); *H04L 12/40* (2013.01); *H04L 2012/40273* (2013.01)

(58) Field of Classification Search
None
See application file for complete search history.

(56) References Cited

U.S. PATENT DOCUMENTS

| 7,117,073 | B2* | 10/2006 | Endo | B62D 15/0275 |
| | | | | 701/28 |
| 7,263,420 | B2* | 8/2007 | Tanaka | B62D 15/0285 |
| | | | | 701/36 |
| 8,299,942 | B2* | 10/2012 | Ko | G06T 3/4038 |
| | | | | 340/435 |
| 9,260,090 | B2* | 2/2016 | Toledo | B60T 7/22 |
| 10,040,482 | B1* | 8/2018 | Jung | B62D 15/0285 |
| 10,082,402 | B2* | 9/2018 | Jung | B62D 15/0285 |
| 10,137,888 | B2* | 11/2018 | Seo | B60T 7/22 |
| 10,242,575 | B1* | 3/2019 | Chan | B62D 15/027 |
| 10,606,272 | B2* | 3/2020 | Seo | G08G 1/14 |

(Continued)

FOREIGN PATENT DOCUMENTS

JP 2012-217000 A 11/2012
JP 2016-192772 A 11/2016

(Continued)

*Primary Examiner* — Chico A Foxx
(74) *Attorney, Agent, or Firm* — Sughrue Mion, PLLC

(57) ABSTRACT

When an automatic parking registration method is selected, a vehicle control ECU performs a pre-registration automatic parking control and stores a position determined based on a position of a vehicle at a time point at which the vehicle is set to a stop state by the pre-registration automatic parking control as a registered parking position in a non-volatile memory. When an execution condition of a post-registration automatic parking control is satisfied, the vehicle control ECU performs the post-registration automatic parking control after setting a target parking position to registered parking position which has been stored in the non-volatile memory.

7 Claims, 13 Drawing Sheets

(56) References Cited

U.S. PATENT DOCUMENTS

| | | | |
|---|---|---|---|
| 2007/0097209 A1* | 5/2007 | Kubota | B62D 15/0275 |
| | | | 348/118 |
| 2010/0060486 A1* | 3/2010 | Nakashima | B62D 15/029 |
| | | | 340/932.2 |
| 2012/0287279 A1* | 11/2012 | Tanaka | G08G 1/168 |
| | | | 348/148 |
| 2016/0288833 A1* | 10/2016 | Heimberger | G08G 1/168 |
| 2018/0050690 A1* | 2/2018 | Kurt | G05D 1/0212 |
| 2018/0052460 A1* | 2/2018 | Kurt | G08G 1/143 |
| 2018/0111608 A1* | 4/2018 | Kim | B60W 10/06 |
| 2018/0178724 A1 | 6/2018 | Hatakeyama et al. | |
| 2018/0362023 A1* | 12/2018 | Kim | G06K 9/00812 |
| 2019/0039605 A1 | 2/2019 | Iio et al. | |
| 2019/0291721 A1* | 9/2019 | Sakano | G06K 9/00805 |
| 2019/0347934 A1* | 11/2019 | Hase | B60W 60/0025 |
| 2020/0114904 A1* | 4/2020 | Lee | G01S 13/931 |
| 2020/0180510 A1* | 6/2020 | Suzuki | B60R 1/00 |

FOREIGN PATENT DOCUMENTS

| | | |
|---|---|---|
| JP | 2017-021427 A | 1/2017 |
| JP | 2017-138664 A | 8/2017 |
| JP | 2018-107754 A | 7/2018 |
| JP | 2018-127065 A | 8/2018 |
| WO | 2017/135321 A1 | 8/2017 |

\* cited by examiner

PARKING SUPPORT APPARATUS

BACKGROUND OF THE INVENTION

1. Field of the Invention

The present invention relates to a parking support apparatus configured to control a vehicle in such a manner that the vehicle is automatically moved to "a parking position which has been registered (a parking position specified by information stored in a memory) in advance" and is then stopped at the parking position.

2. Description of the Related Art

A parking support apparatus (hereinafter, referred to as a "conventional apparatus"), which is disclosed in WO 2017/135321, can register in advance (or store in a memory beforehand), as a registered parking position, a position of a parking space which is not marked off by parking frame lines, on itself. In order to register the position of the parking space on the conventional apparatus, a driver needs to move a vehicle into the parking space which the driver wants to be registered by the driver's own driving operation.

Furthermore, when the position of the parking space has been registered as the registered parking position, the conventional apparatus can perform an automatic parking control to automatically move the vehicle to the registered parking position. In this case, the conventional apparatus determines a target path for moving the vehicle to the registered parking position and let the vehicle move/run along the determined target path.

As mentioned above, when the driver causes the conventional apparatus to register the position of the parking space, it is necessary for the driver to move the vehicle into that parking space by the driver's own driving operation. If there is a place where the vehicle is difficult to travel between "the position of the vehicle at a time point at which the driver starts to drive for parking the vehicle" and "the position of the parking space intended to be registered", the driver moves/drives the vehicle in such a manner that the vehicle avoids the places. Such a place may include an uneven step (e.g., an uneven step between a sidewalk and a roadway, and a curbstone) and a pole.

However, when the position of the parking space into which the vehicle was moved by the driver's own driving operation has been registered as the registered parking position, and the automatic parking control for moving (parking) the vehicle automatically into the registered parking position is performed, there is a possibility that the generated target path includes/crosses "the place where the vehicle is difficult to travel". Such a situation may occur, for example, when an imaging device of the vehicle is located at a position at which the automatic parking control is started cannot photograph (take a picture of) "the place where the vehicle is difficult to travel", or when it is difficult to determine based on image data obtained by the imaging device whether or not there is "the place where the vehicle is difficult to travel" on the generated target path. When this happen, the conventional apparatus cannot move the vehicle along the target path. That is, according to the conventional apparatus, even when the position of the parking space has been registered, there is a possibility that the vehicle cannot be moved to the registered position of the parking space (i.e., the registered parking position) through the automatic parking control.

SUMMARY OF THE INVENTION

The present invention has been made in order to solve the above-described problem. That is, an object of the present invention is to provide a parking support apparatus capable of reducing a possibility of being unable to cause a vehicle to automatically move to and park at a registered parking position which has been registered in advance, through an automatic parking control. Hereinafter, the parking support apparatus according to the present invention may also be referred to as the "present invention apparatus".

The present invention apparatus comprises:

an imaging device (21) configured to take a picture of a peripheral area of a vehicle (SV) to obtain image data;

an instruction device (22) configured to be capable of generating instruction signals based on operations performed by a driver of the vehicle;

a control device (10) configured to be capable of performing an automatic parking control to automatically move the vehicle to a target parking position based on the image data and thereafter set the vehicle to a parking state; and a memory device (10) configured to be capable of storing information specifying a parking position as a registered parking position in advance.

The control device is configured:

to perform, when a first instruction signal of the instruction signals from the instruction device is received (refer to a "Yes" determination at step 1110), the automatic parking control (refer to step 1115) and cause the memory device to store information specifying a first determination position, as the registered parking position, the first determination position being determined based on a position of the vehicle of a time point at which the vehicle is set to the parking state through the automatic parking control (refer to step 1135; and to perform, when a second instruction signal of the instruction signals from the instruction device is received (refer to a "Yes" determination at step 1325), the automatic parking control using, as the target parking position, the registered parking position specified by the information stored in the memory device (refer to step 1330).

The present invention apparatus performs the automatic parking control, and thereafter, stores information specifying the first determination position as the registered parking position. The first determination position is a position which is determined based on a position of the vehicle of a time point at which the vehicle is set to the parking state through the automatic parking control. Accordingly, thereafter, when the automatic parking control is performed using the registered parking position as the target parking position, there is a high possibility that the vehicle can be moved to the target parking position through the automatic parking control. Consequently, the present apparatus can reduce a possibility that the vehicle cannot be automatically moved to and parked at the registered parking position.

In one of aspects of the present invention apparatus, the control device is configured, when a third instruction signal of the instruction signals from the instruction device is received (refer to a "Yes" determination at step 1210):

to recognize, as a reference position, a position of the vehicle of a parking state set time point at which the vehicle is set to a parking state after the vehicle is moved by a driving operation of the driver; and to cause the memory device to store information specifying a second determination position, as the registered parking position, the second determination position being determined based on the reference position (refer to step 1230).

According to the above-mentioned aspect of the present invention apparatus, even when the vehicle is set to the parking state after the vehicle is moved by the driving operation of the driver (i.e., through a manual parking), the parked position can be registered as the registered parking position.

In one of aspects of the present invention apparatus, the control device is configured, when the third instruction signal is received, to recognize, as the reference position, a position of the vehicle of a shift time point at which a shift position of a shift lever (72) is changed from a shift position other than a parking position to the parking position, the shift time point being regarded as the parking state set time point (refer to step 1220).

The above-mentioned aspect of the present invention apparatus does not require the driver to perform complicated operations in order for the driver to store "the information specifying the position as the registered parking position" in the memory device, when the driver parks the vehicle. In other words, the parked position obtained by the driving operation of the driver can be easily registered without the complicated operation.

In one of aspects of the present invention apparatus, the control device is configured (refer to step 1135), when the first instruction signal is received:
to obtain feature point information including positional information of a three-dimensional object present on a road surface around of the vehicle based on the image data obtained in a period between a start time point of the automatic parking control (at the start time point at which the automatic parking control is started) and a completion time point of the automatic parking control (at the completion time point at which the automatic parking control is completed); and
to store the feature point information in the memory device with/after relating the feature point information to the first determining position (the registered parking position); and the control device is further configured (refer to step 1330), when the second instruction signal is received:
to obtain the feature point information as actual feature point information based on the image data; and
to perform the automatic parking control based on the feature point information stored in the memory device and the actual feature point information.

According to the above-mentioned aspect of the present invention apparatus, when the second instruction signal is received, the automatic parking control can be surely performed, even when the target parking position is not marked off by a parking frame line(s), since the feature point information stored in the memory device and the actual feature point information feature point information are used for the automatic parking control.

In one of aspects of the present invention apparatus, the control device is configured to accept the second instruction signal, when the vehicle is determined to be present in the vicinity (surroundings) of "a position specified by the stored information in the memory device" as the registered parking position, based on the image data (refer to step 1320).

The above-mentioned aspect of the present invention apparatus can notify the driver that the vehicle is present at a position from which the vehicle can be moved to and parked at the registered parking position through the automatic parking control.

In one of aspects of the present invention apparatus, the instruction device includes a touchscreen (22) capable of displaying an image.

Furthermore, the control device is configured:
to cause, after the first instruction signal is received, the touchscreen to display a display image (G5) (refer to step 1125) including:
a peripheral image (G5h) showing surroundings of the vehicle of the time point at which the vehicle is set to the parking state through the automatic parking control;
a registration intended position display frame (G5a1) indicative of a position of said vehicle of said time point at which said vehicle is set to said parking state through said automatic parking control;
a registration button (G5a3); and
a position operation button (G5a2),
to cause the touchscreen to change a display position of the registration intended position display frame in the peripheral image in accordance with an operation to the position operation button, when the position operation button is operated (refer to step 1125, step 1130); and
to cause the memory device to store information specifying a parking position corresponding to the display position of the registration intended position display frame in the peripheral image, as the registered parking position (refer to step 1135), when the registration button is operated (refer to a "Yes" determination at step 1130).

The above-mentioned aspect of the present invention apparatus can allow the driver/user to make a fine adjustment of the position of the vehicle to be registered as the registered parking position through an intuitive operation.

In the above description, the terms and/or the reference symbols used in the following description regarding embodiment(s) are added with parentheses to the elements of the present invention apparatus, in order to assist in understanding the present invention. However, those reference symbols should not be used to limit the scope of the invention.

DETAILED DESCRIPTION OF THE EMBODIMENT

<Construction>

Figure 1:
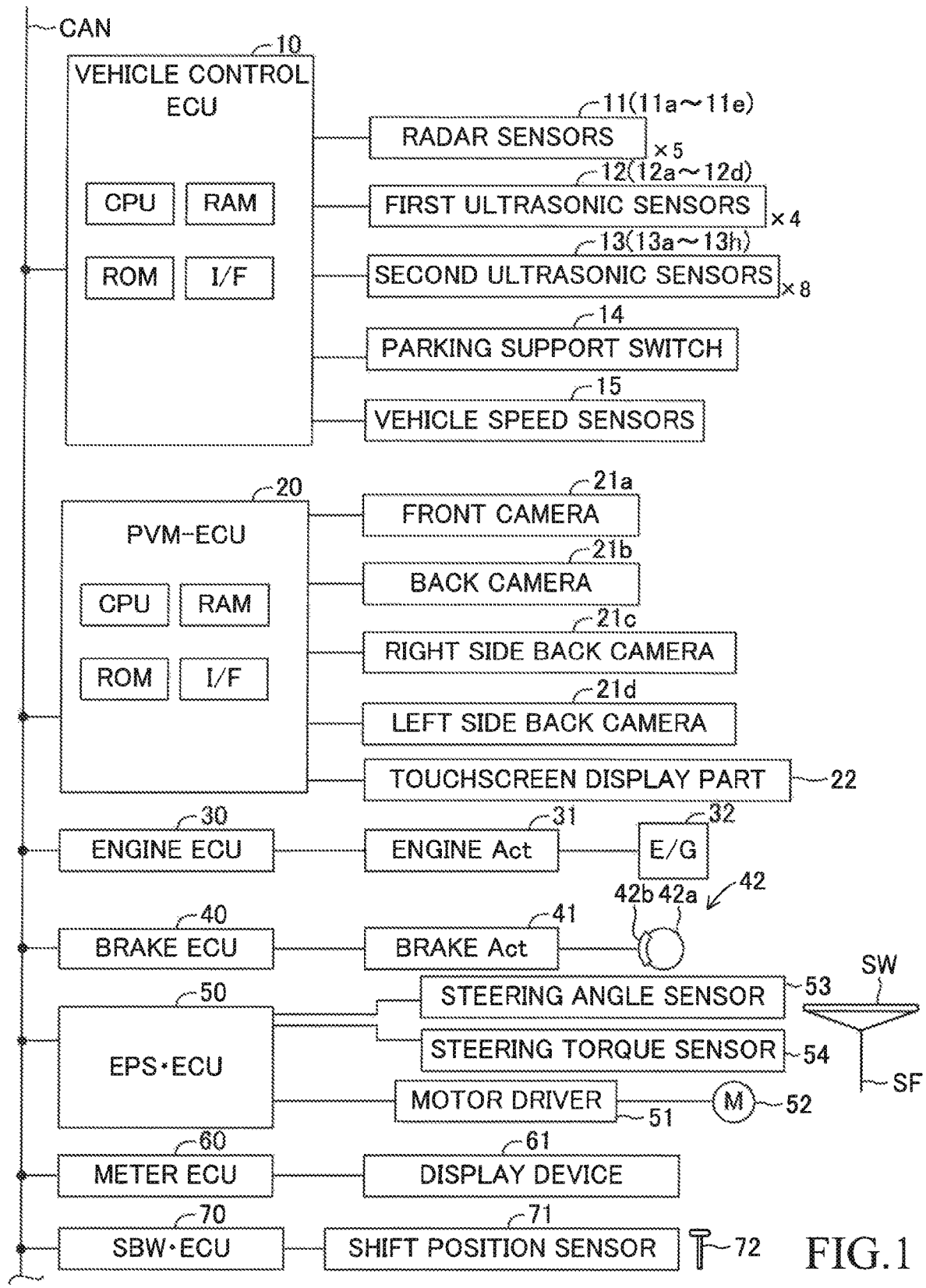
FIG. 1 is a schematic configuration diagram illustrating a parking support apparatus according to an embodiment of the present invention.

A parking support apparatus (hereinafter, referred to as a "present apparatus") according to an embodiment of the present invention is applied to a vehicle SV (refer to FIG. 2). As shown in FIG. 1, the present apparatus includes a vehicle control ECU 10, a PVM (Panoramic View Monitor) ECU 20, an engine ECU 30, a brake ECU 40, an EPS ECU 50, a meter ECU 60, and an SBW (Shift-by-Wire) ECU 70. It should be noted that the vehicle control ECU 10 is also simply referred to as a "VCECU", hereinafter.

Each of those ECUs includes a microcomputer. The microcomputer includes a CPU, a ROM, a RAM, a readable and writable non-volatile memory (in the present specification, may be referred to as a memory device), and an interface I/F. The CPU realizes various functions by executing instructions (programs, routines) stored in the ROM. Furthermore, the ECUs are connected with each other via a CAN (Controller Area Network) so that they are capable of mutually transmitting and receiving data (information). Therefore, a detection signal indicative of a detection value detected by a sensor (or a switch) which is connected to a certain ECU can be transmitted to at least any one of the ECUs other than the certain ECU.

A plurality of radar sensors 11a to 11e, a plurality of first ultrasonic sensors 12a to 12d, a plurality of second ultrasonic sensors 13a to 13h, a parking support switch 14, and vehicle speed sensors 15 are connected to the VCECU.

It should be noted that when the radar sensors 11a to 11e do not need to be distinguished from each other, each of them is referred to as a "radar sensor 11". When the first ultrasonic sensors 12a to 12d do not need to be distinguished from each other, each of them is referred to as a "first ultrasonic sensor 12". When the second ultrasonic sensors 13a to 13h do not need to be distinguished from each other, each of them is referred to as a "second ultrasonic sensor 13".

The radar sensor 11 is a well-known sensor using a radar wave (hereinafter, referred to as a "millimeter wave") which is an electric wave in a millimeter waveband. The radar sensor 11 obtains target object information to output/transmit the obtained target object information to the VCECU. The target object information includes a distance between the vehicle SV and a three-dimensional object (as a target object), a relative speed between the vehicle SV and the three-dimensional object, and a relative position (a direction) of the three-dimensional object with respect to the vehicle SV.

The radar sensor 11 (each of radar sensors 11a to 11e) is provided/disposed at each of positions (the positions shown in FIG. 2) of the vehicle SV and obtains the target object information on the three-dimensional object (one or more three-dimensional objects) present within each of predetermined detection areas described below.

The radar sensor 11a obtains the target object information of the three-dimensional object present within a right front area of the vehicle SV. The radar sensor 11b obtains the target object information of the three-dimensional object present within a front area (a center front area) of the vehicle SV. The radar sensor 11c obtains the target object information of the three-dimensional object present within a left front area of the vehicle SV. The radar sensor 11d obtains the target object information of the three-dimensional object present within a right rear area of the vehicle SV. The radar sensor 11e obtains the target object information of the three-dimensional object present within a left rear area of the vehicle SV.

Each of the first ultrasonic sensor 12 and the second ultrasonic sensor 13 is a well-known sensor using an ultrasonic wave. When the first ultrasonic sensor 12 and the second ultrasonic sensor 13 do not need to be distinguished from each other, each of them is referred to as an "ultrasonic sensor".

The ultrasonic sensor radiates the ultrasonic wave to a predetermined radiation area and receives a reflected wave which is the radiated wave reflected by the three-dimensional object. The ultrasonic sensor determines whether or not the three-dimensional object is present within the radiation area. If the object is present, the ultrasonic sensor detects/calculates a distance between the vehicle SV and the three-dimensional object based on a time length from radiation of the ultrasonic wave to reception of the reflected wave. The first ultrasonic sensor 12 is used for detecting the three-dimensional object at a relatively faraway position with respect to the vehicle SV as compared with a position of the three-dimensional object to be detected by the second ultrasonic sensor 13. Each of the ultrasonic sensors is provided/disposed at each of positions (the positions shown in FIG. 2) of a vehicle body 200.

The first ultrasonic sensor 12 (each of the first ultrasonic sensors 12a to 12c) obtains/detects a distance between the first ultrasonic sensor 12 and the three-dimensional object present within each of predetermined areas (detection areas) described below, and transmits information on the obtained/detected distance to the VCECU.

The detection area of the first ultrasonic sensor 12a is an area on the right side of a front part of the vehicle SV. The detection area of the first ultrasonic sensor 12b is an area on the left side of the front part of the vehicle SV. The detection area of the first ultrasonic sensor 12c is an area on the right side of a rear part of the vehicle SV. The detection area of the first ultrasonic sensor 12d is an area on the left side of the rear part of the vehicle SV.

The second ultrasonic sensor 13 (each of the second ultrasonic sensors 13a to 13h) obtains/detects a distance between the second ultrasonic sensor 13 and the three-dimensional object present in each of predetermined areas (detection areas) described below, and transmits information on the obtained/detected distance to the VCECU.

Each of the detection areas of the second ultrasonic sensors 13a to 13d is an area in front (ahead) of the vehicle SV. Each of the detection areas of the second ultrasonic sensors 13e to 13h is an area behind the vehicle SV.

The parking support switch 14 is a switch to be operated (pressed/depressed) by a user/driver of the vehicle SV.

The vehicle speed sensors 15 are configured to detect a vehicle speed of the vehicle SV to output a signal indicative of the detected vehicle speed. More specifically, the vehicle speed sensors 15 may be wheel speed sensors. Each of the wheel speed sensors is provided for each of four wheels of the vehicle SV. The VCECU is configured to obtain/calculate the vehicle speed based on all of the wheel speeds, each of which is detected by each of the wheel speed sensors.

Each of a front camera 21a, a back camera 21b, a right side camera 21c, and a left side camera 21d is connected to the PVM ECU 20. It should be noted that, hereinafter, when the front camera 21a, the back camera 21b, the right side camera 21c, and the left side camera 21d do not need to be distinguished from each other, each of them is referred to as a "camera 21". The camera 21 is also referred to as an "imaging device".

Figure 2:
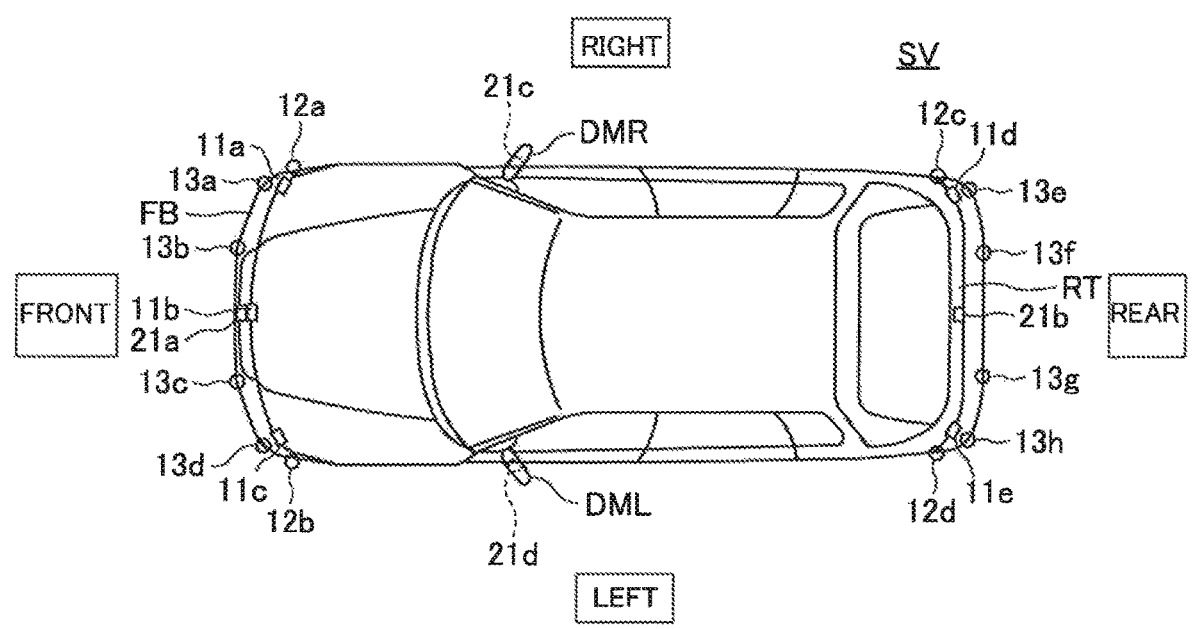
FIG. 2 is a plan view illustrating arrangement of radar sensors, first ultrasonic sensors, second ultrasonic sensors, and camera sensors.

As shown in FIG. 2, the front camera 21a is provided at a substantially central part of a front bumper FB in a vehicle width direction. An optical axis of the front camera 21a faces/extends forward from the vehicle SV. The back camera 21b is provided at a wall part of a rear trunk RT at a rear part of the vehicle SV. An optical axis of the back camera 21b faces/extends backward from the vehicle SV. The right side camera 21c is provided at a right side door mirror DMR. An optical axis of the right side camera 21c faces/extends rightward from the vehicle SV. The left side camera 21d is provided at a left side door mirror DML. An optical axis of the left side camera 21d faces/extends leftward from the vehicle SV.

An angle of view of the camera 21 is a wide angle. Therefore, an imaging range of the camera 21 includes "a range on a diagonal right side with respect to the optical axis, a range on a diagonal left side with respect to the optical axis, a range on a diagonal lower side with respect to the optical axis, and a range on a diagonal upper side with respect to the optical axis". Therefore, the imaging ranges of the four cameras 21 cover entire surroundings of the vehicle SV.

The camera 21 photographs (takes an image of) a part of the surroundings (a peripheral area) of the vehicle SV which corresponds to its imaging range to thereby obtain image information (image data) on the imaging range, every time a predetermined time elapses. The camera 21 transmits the obtained image data to the PVM ECU 20 and the VCECU.

More specifically, the front camera 21a photographs "the part of the peripheral area in front (ahead) of the vehicle SV" corresponding to its imaging range. The front camera 21a obtains the image data (hereinafter, referred to as "front image data") obtained by photographing that part so as to transmit the obtained front image data to the PVM ECU 20. The back camera 21b photographs "the part of the peripheral area behind the vehicle SV" corresponding to its the imaging range. The back camera 21b transmits the image data (hereinafter, referred to as "backward image data") obtained by photographing that part to the PVM ECU 20. The right side camera 21c photographs "the part of the peripheral area on the right side of the vehicle SV" corresponding to its imaging range. The right side camera 21c transmits the image data (hereinafter, referred to as "right side image data") obtained by photographing that part to the PVM ECU 20. The left side camera 21d photographs "the part of the peripheral area on the left side of the vehicle SV" corresponding to its imaging range. The left side camera 21d transmits the image data (hereinafter, referred to as "left side image data") obtained by photographing that part to the PVM ECU 20.

The PVM ECU 20 generates peripheral/surroundings image data using the front image data, the backward image data, the right side image data, and the left side image data. An image displayed (generated) based on the peripheral image data is referred to as a "peripheral image". The peripheral image is an image corresponding to at least a part of the peripheral area of the vehicle SV. The peripheral image includes a camera viewpoint image and composite images. The camera viewpoint image is an image whose viewpoint is an arrangement position of a lens of the camera 21. In other words, the camera viewpoint image is an image when viewing the surroundings of the vehicle SV from the arrangement position of the lens of the camera 21. One of the composite images is an image (hereinafter, also referred to as a "virtual viewpoint image") when viewing the surroundings of the vehicle SV from a virtual viewpoint set at an arbitrary position around the vehicle SV.

A method for generating the virtual viewpoint image is well known (for example, refer to Japanese Patent Application Laid-Open No. 2012-217000, Japanese Patent Application Laid-Open No. 2016-192772, and Japanese Patent Application Laid-Open No. 2018-107754). It should be noted that the PVM ECU 20 may generate an image obtained by combining other images, lines, or the like, together with each of the camera viewpoint image and the virtual viewpoint image. For example, one of the other images is a vehicle image (for example, a polygon indicative of a shape of the vehicle SV). The lines are ones that can support a driver's parking operation (a movement of the vehicle for parking). The image generated in the above-described manner is also referred to as the "peripheral image".

An outline of the method for generating virtual viewpoint image data will be briefly described. The virtual viewpoint image is generated based on the virtual viewpoint image data. The PVM ECU 20 projects pixels included in the front image data, the backward image data, the right side image data, and the left side image data, onto a predetermined projection curved surface (for example, a curved surface having a bowl shape or a half-sphere) in a virtual three-dimensional space.

The center of the predetermined projection curved surface corresponds to the predetermined (or center) position in a plan view of the vehicle SV. The projection curved surface corresponds to (or is allocated to) the front image data, the backward image data, the right side image data, and the left side image data. The PVM ECU 20 projects information on the pixels included in the front image data, the backward image data, the right side image data, and the left side image data, onto the predetermined projection curved surface.

The PVM ECU 20 arranges the polygon representing the shape of the vehicle SV at the center of the predetermined projection curved surface. Thereafter, the PVM ECU 20 sets the virtual viewpoint in the virtual three-dimensional space and cuts out (extracts), as image data, a predetermined area of the predetermined projection curved surface when viewing from the set virtual viewpoint, the predetermined area being included in a predetermined view angle. Furthermore, the PVM ECU 20 superimposes "the polygon representing the shape of the vehicle SV" included in the predetermined view angle when viewing from the virtual viewpoint onto the image data which has been cut out (extracted). Thereby, the virtual viewpoint image data is generated.

A touchscreen display part 22 is also connected to the PVM ECU 20. The touchscreen display part 22 is a touchscreen type display (a touchscreen) of a navigation device (not shown). The PVM ECU 20 displays the peripheral image on the touchscreen display part 22, in response to an instruction transmitted from the VCECU.

When the VCECU performs a parking support control and a parking position registration, the PVM ECU 20 displays a parking support image (an operation image) including the peripheral image on the touchscreen display part 22 in response to the instruction transmitted from the VCECU.

The PVM ECU 20 performs an image analysis process for the peripheral image which has been generated, every time the predetermined time elapses to thereby detect (recognize/extract) feature points in the peripheral image. Then, the PVM ECU 20 stores information (also referred to as "feature point information") including a positional information (a three-dimensional position) on the detected feature points in the non-volatile memory together with the ID information for identifying each of the detected feature points. In addition, the PVM ECU 20 transmits the feature point information to the VCECU, every time the predetermined time elapses.

The engine ECU 30 is connected to an engine actuator 31. The engine actuator 31 includes a throttle valve actuator for changing an opening degree of a throttle valve for adjusting an intake air amount of an engine 32 (in this embodiment, the engine 32 is a spark ignition-and-fuel injection type internal combustion engine). The engine ECU 30 changes a torque generated by the engine 32 by controlling the engine actuator 31. The torque generated by the engine 32 is transmitted to drive wheels through a transmission (not shown).

Therefore, the engine ECU 30 controls the engine actuator 31 to thereby control a driving force of the vehicle SV. The VCECU is capable of transmitting a driving instruction to the engine ECU 30. The engine ECU 30 receives that driving instruction to control the engine actuator 31 in accordance with the received driving instruction. Therefore, the VCECU is capable of performing an "automatic driving force control" described later through the engine ECU 30. It should be noted that if the vehicle SV is a hybrid vehicle, the engine ECU 30 controls at least any one of "an internal combustion engine and an electric motor" that are driving sources so as to control the driving force of the vehicle SV. Furthermore, if the vehicle SV is an electric vehicle, the engine ECU 30 controls an electric motor serving as the driving source so as to control the driving force of the vehicle SV.

The brake ECU 40 is connected to a brake actuator 41. The brake actuator 41 is provided in a hydraulic circuit provided between a master cylinder (not shown) for pressurizing hydraulic oil using a depression force of a brake pedal and a friction brake mechanism provided in right-and-left front-and-rear wheels of the vehicle SV. The friction brake mechanism 42 includes brake discs 42a and brake calipers 42b. Each of the brake discs 42a is secured to the corresponding wheel of the vehicle SV. Each of the brake calipers 42b is secured to the body of the vehicle SV at a position of the corresponding wheel.

The brake actuator 41 adjusts a hydraulic pressure supplied to a wheel cylinder (not shown) in each of the brake caliper 42b in accordance with a command transmitted from the brake ECU 40 to activate the wheel cylinder by the hydraulic pressure to press a brake pad (not shown) on the brake disc 42a, to thereby generate a friction braking force on the brake disc 42a. Therefore, the brake ECU 40 can control the brake actuator 41 to control a braking force applied to the vehicle SV, in particular, to the wheels. The VCECU is capable of transmitting a braking instruction to the brake ECU 40. The brake ECU 40 receives that braking instruction to control the brake actuator 41 in accordance with the received braking instruction. Therefore, the VCECU is capable of performing an "automatic braking force control" described later through the brake ECU 40.

The EPS ECU 50 is a control unit of a well-known electric power steering system and is connected to a motor driver 51. The motor driver 51 is connected to a steering motor 52. The steering motor 52 is incorporated into a "steering mechanism including a steering wheel SW, a steering shaft US, and an unillustrated gear mechanism for steering". The steering motor 52 generates a torque by electric power supplied from the motor driver 51 to thereby be able to generate a steering assist torque to the steering mechanism or steer the left and right steered wheels using the generated torque. That is, the steering motor 52 can change a steering angle (also referred to as a "turning angle") of the vehicle SV.

Furthermore, the EPS ECU 50 is connected to a steering angle sensor 53 and a steering torque sensor 54. The steering angle sensor 53 detects a steering angle of the steering wheel SW of the vehicle SV to generate a signal indicative of the detected steering angle. The steering torque sensor 54 detects a steering torque (the steering assist torque) applied to the steering shaft SF due to operation of the steering wheel SW to generate a signal indicative of the detected steering torque.

The EPS ECU 50 detects/obtains the steering torque applied to the steering wheel SW by a driver using the steering torque sensor 54 to drive the steering motor 52 based on the detected/obtained steering torque. The EPS ECU 50 drives the steering motor 52 to thereby apply the steering torque (the steering assist torque) to the steering mechanism. Thereby, the EPS ECU 50 can assist a steering operation (a steering wheel operation) of the driver.

The VCECU is capable of transmitting a steering instruction to the EPS ECU 50. The EPS ECU 50 receives that steering instruction to drive the steering motor 52 based on the received steering instruction. Therefore, the VCECU can automatically change the steering angles of the steering wheels of the vehicle SV through the EPS ECU 50. In other words, the VCECU can change the steering angles of the steered wheels of the vehicle SV without the steering operation of the driver. That is, the VCECU can perform an "automatic steering angle control" described later through the EPS ECU 50.

The meter ECU 60 is connected to a display device 61. The display device 61 is a multi-information display provided in front of a driver seat. The display device 61 displays various information in addition to measured values such as the vehicle speed and an engine rotation speed.

The SBW ECU 70 is connected to a shift position sensor 71. The shift position sensor 71 detects a position of a shift lever 72 serving as a movable part of a shift operation part. In this embodiment, positions of the shift lever 72 include a parking position (P), a forward position (D), and a reverse position (R). The SBW ECU 70 is configured to receive the position of the shift lever 72 from the shift position sensor 71 to control a "transmission and/or driving-direction switching mechanism (not shown)" of the vehicle SV based on the shift lever position (i.e., perform a shift control of the vehicle SV).

More specifically, when the position of the shift lever 72 is "P", the SBW ECU 70 controls the "transmission and/or driving-direction switching mechanism" in such a manner that the driving force is not transmitted to the drive wheels and the vehicle SV is thus mechanically locked to a stop position. When the position of the shift lever 72 is "D", the SBW ECU 70 controls the "transmission and/or driving-direction switching mechanism" in such a manner that the driving force for moving the vehicle SV forward is transmitted to the drive wheels. Furthermore, when the position of the shift lever 72 is "R", the SBW ECU 70 controls the "transmission and/or driving-direction switching mechanism" in such a manner that the driving force for moving the vehicle backward is transmitted to the drive wheels.

The VCECU is capable of transmitting a shift instruction to the SBW ECU 70. When the SBW ECU 70 receives the shift instruction, the SBW ECU 70 control the "transmission and/or driving-direction switching mechanism" and change the position of the shift lever 72, without the operation of the shift lever 72 of the driver. The control of "transmission and/or driving-direction switching mechanism" executed based on the shift instruction transmitted from the VCECU is referred to as an "automatic shift position control".

<Operation>

(Registration of Parking Position)

The user/driver of the vehicle SV is allowed to register in advance (beforehand) "a position at which the user intends/plans to park the vehicle SV (i.e., an intended parking position)" as a registered parking position on the VCECU. In other words, the VCECU is configured to store and hold "information specifying the intended parking position" in the non-volatile memory beforehand. As shown in "a part on the upper side with respect to a broken line Ln on the sheet of FIG. 3", the registered parking position may be a position of a parking space PS (for example, a parking space belonging to a home MH) which is not marked off by a parking frame line(s). Note however, the registered parking position may be a position of a parking space which has been marked off by the parking frame line(s).

It should be noted that, in each sheet of FIGS. 3 to 9, a diagram shown in the part on the upper side/part with respect to the broken line Ln may be referred to as an "upper diagram" and a diagram shown in the part on the lower side/part with respect to the broken line Ln may be referred to as a "lower diagram". Each of the upper diagrams in FIGS. 3 to 9 shows a positional relationship between the vehicle SV, the home (house) MH, and the parking space PS. Each of the lower diagrams shows "images that are displayed on the touchscreen display part 22" when the vehicle SV, the home MH, and the parking space PS have the positional relationship shown in the upper part of each of the FIGS. 3 to 9. Furthermore, a sentence in a frame line W1 in the upper part of each of FIGS. 3 to 9 describes the operation of the vehicle SV or of the present apparatus. A sentence in a frame line W2 in the lower part of each of FIGS. 3 to 9 describes the action (operation) of the user/driver. A finger of the user is denoted by "U1".

The present apparatus is configured on the premise that the vehicle SV is moved backward to the parking position. Therefore, when the user parks the vehicle SV, the user firstly moves the vehicle SV and stop the vehicle SV at a first position from which the user believes the vehicle SV can be moved backward (or backed) to "a position at which the user wants/intends to park", and thereafter, the user operates (e.g., turns on) the parking support switch 14 in a state in which the vehicle SV is stopped at the first position.

Figure 3:
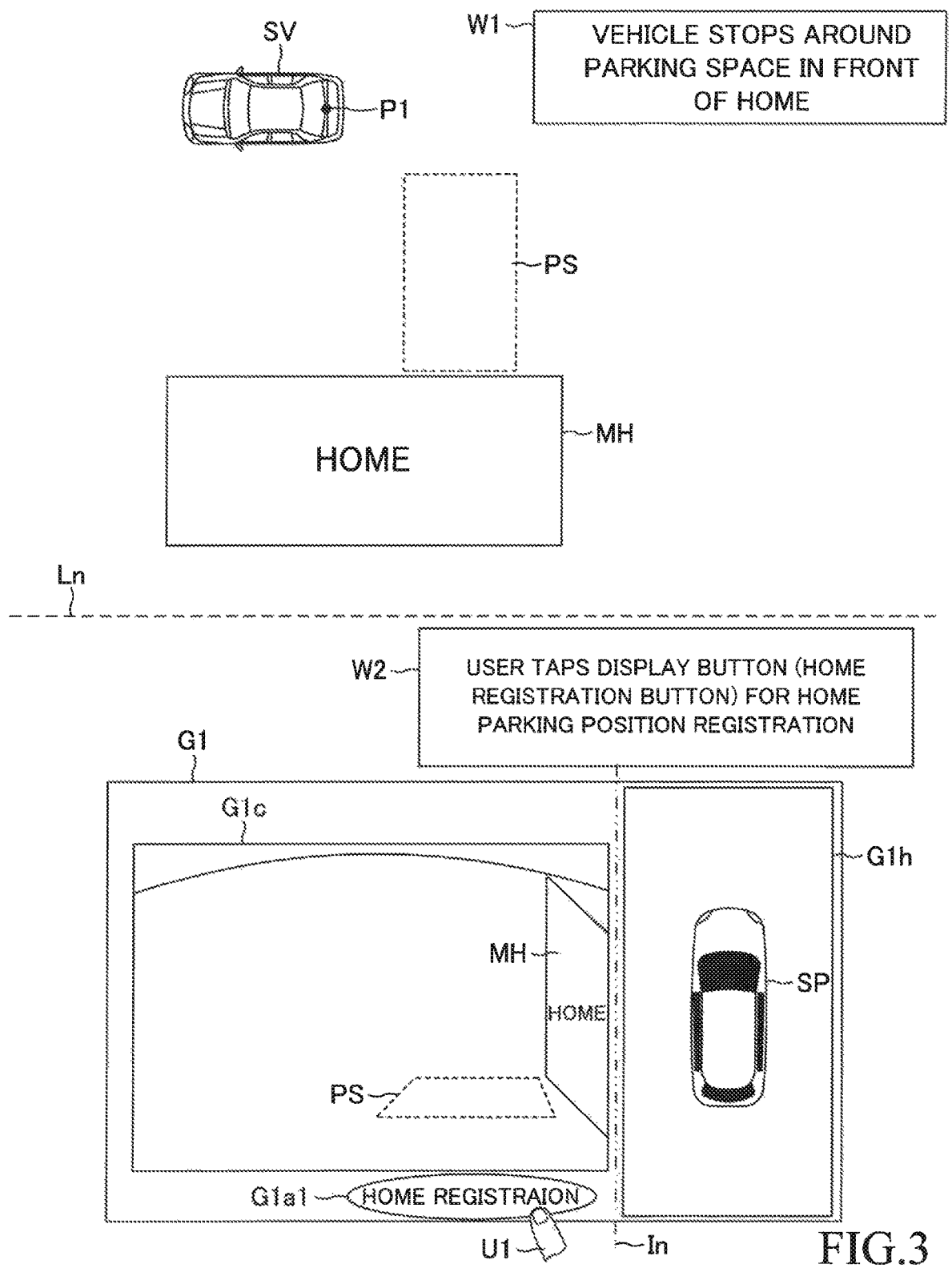
FIG. 3 illustrates operation of the parking support apparatus and a display image displayed on a display part when registering a parking position.

For example, as shown in the upper part of FIG. 3, when the user wants/intends to park the vehicle SV in the parking space PS of the home MH, the user firstly stops the vehicle SV at a point P1. Thereafter, the user operates the parking support switch 14 in a state in which the vehicle SV is stopped at the position P1. As a result, the VCECU displays two buttons (not shown) on the touchscreen display part 22. One of the two buttons functions as a switch (a parking request switch) to be operated by the user when the user wants to automatically park the vehicle SV. The other one of the two buttons functions as a switch (a parking rejection switch) to be operated by the user when the user does not want to automatically park the vehicle SV. It should be noted that the user taps/touches a button displayed on the touchscreen display part 22 to thereby operate that button. Hereinafter, the operation such as tapping the touchscreen display part 22 may sometimes be referred to as "touch operation" or "tapping". The touch operation to the button displayed on the touchscreen display part 22 is transformed into (generates) an operation signal or an instruction signal corresponding to that touch operation. The VCECU receives the operation/instruction signal from the touchscreen display part 22.

When the user taps the parking request switch (not shown), the VCECU displays a display image G1 shown in the lower part of FIG. 3 on the touchscreen display part 22. The display image G1 is divided into a left side section (a section on the left side with respect to an imaginary line In) and a right side section (a section on the right side with respect to the imaginary line In). The left side section of the display image G1 includes a camera viewpoint image G1c and a display button G1a1 for a home parking position registration. The right side section of the display image G1 includes an overhead view image G1h.

The camera viewpoint image G1c is a camera viewpoint image whose viewpoint is an arrangement position of the lens of the camera 21 which photographs a landscape in the moving direction of the vehicle SV. More specifically, the camera viewpoint image G1c shown in FIG. 3 is the camera viewpoint image whose viewpoint is the arrangement position of the lens of the back camera 21b. When the registered parking position has not been registered (i.e., when the VCECU has not stored the information specifying the intended parking position as the registered parking position), a frame indicative of a parking position candidate PS (i.e., a candidate of a parking space PS) is superimposed on the camera viewpoint image G1c. The VCECU determines the parking position candidate PS based on a current position of the vehicle SV. The display button G1a1 is a button to be tapped by the user, in order for the user to cause the VCECU to start registration operation (registration processes) of the parking position.

It should be noted that when the intended parking position has been already registered as the registered parking position, and if the registered parking position is detected within a "space in the camera viewpoint image G1c" in which the vehicle SV seems to be able to be parked, a frame indicative of that registered parking position is superimposed on that camera viewpoint image G1c. Furthermore, in this case, an "execution button" for performing a post-registration (or after-registration) automatic parking control, described later in detail, is additionally displayed in the display image G1.

The overhead view image G1h is the peripheral image including the polygon SP corresponding to the vehicle SV and an overhead virtual viewpoint image, where the polygon SP is superimposed on the overhead virtual viewpoint image. The overhead virtual viewpoint image is an image corresponding to an area cut out (extracted) as an image from the predetermined projection curved surface when viewing the predetermined projection curved surface from a virtual viewpoint set immediately above the vehicle SV. The cut out (extracted) area is included in a predetermined view angle.

Figure 4:
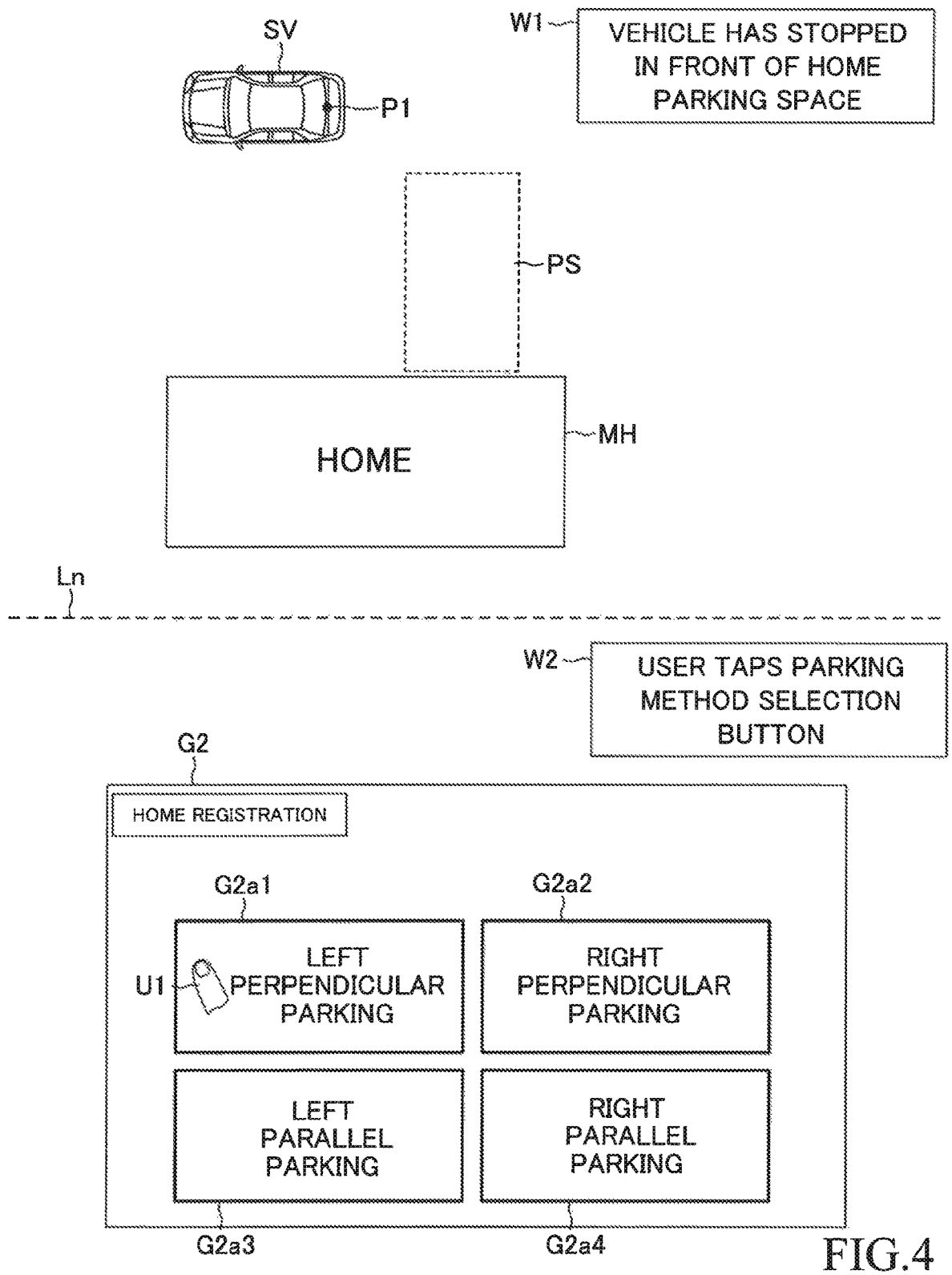
FIG. 4 illustrates the operation of the parking support apparatus and a display image displayed on the display part when registering the parking position.

When the user taps/touches the display button G1a1, the VCECU displays a display image G2 shown in the lower part of FIG. 4 on the touchscreen display part 22. The display image G2 includes four parking method selection buttons. More specifically, the parking method selection buttons are a first parking method selection button G2a1, a second parking method selection button G2a2, a third parking method selection button G2a3, and a fourth parking method selection button G2a4. Those parking method selection buttons are buttons to be tapped by the user in order for the user to select/determine a parking method.

When the user taps any one of the first to the fourth parking method selection buttons (G2a1 to G2a4), the VCECU determines/specifies the parking method corresponding to the parking method selection button which has been tapped by the user as the currently employed parking method of the vehicle SV.

More specifically, when the first parking method selection button G2a1 is tapped, the VCECU determines a parking method through a left perpendicular parking as the parking method of the vehicle SV. The parking method through the left perpendicular parking is a perpendicular parking method by which the vehicle SV is automatically moved into a parking space present on the left side of the vehicle SV which is located at the first position (start position) so as to park the vehicle SV in the parking space.

When the second parking method selection button G2a2 is tapped, the VCECU determines a parking method through a right perpendicular parking as the parking method of the vehicle SV. The parking method through the left perpendicular parking is a perpendicular parking method by which the vehicle SV is automatically moved into a parking space present on the right side of the vehicle SV which is located at the first position (start position) so as to park the vehicle SV in the parking space.

When the third parking method selection button G2a3 is tapped, the VCECU determines a parking method through a left parallel parking as the parking method of the vehicle SV. The parking method through the left parallel parking is a parallel parking method by which the vehicle SV is automatically moved into a parking space present on the left side of the vehicle SV which is located at the first position (start position) so as to park the vehicle SV in the parking space.

When the fourth parking method selection button G2a4 is tapped, the VCECU determines a parking method through a right parallel parking as the parking method of the vehicle SV. The parking method through the right parallel parking is a parallel parking method by which the vehicle SV is automatically moved into a parking space present on the right side of the vehicle SV which is located at the first position (start position) so as to park the vehicle SV in the parking space.

Here, it is assumed that the first parking selection button G2a1 is tapped by the user. In this case, the VCECU determines the parking method through the left perpendicular parking as the parking method of the vehicle SV. Furthermore, the VCECU displays a display image G3 shown in the lower part of FIG. 5 on the touchscreen display part 22.

The display image G3 includes a registration button G3a1 for registering an automatic parking position as the registered parking position and a registration button G3a2 for registering a driver parking position as the registered parking position. The registration buttons G3a1 and G3a2 are buttons to be tapped in order for the user to select a "parking position to be registered on the VCECU" and to determine the registration method. In other words, those registration buttons G3a1 and G3a2 are buttons to be tapped in order for the user to determine which/what parking method (e.g., either one of the parking method using the automatic parking control and the parking method using the manual operation of the driver) is used when registering "a position at which the vehicle is parked" on the VCECU. Hereinafter, the "parking position to be registered on the VCECU" is sometimes referred to as a "registration intended parking position"

When the user taps one of the registration button G3a1 and the registration button G3a2, the VCECU determines "a parking position determined based on the parking method corresponding to the tapped registration button" as the registration intended parking position. More specifically, when the registration button G3a1 is tapped, the VCECU determines "a position at which the vehicle SV is parked through the automatic parking control", as the registration intended parking position. In other words, when the registration button G3a1 is tapped, the VCECU selects/employs an automatic parking registration method. When the registration button G3a2 is tapped, the VCECU determines "a position at which the vehicle SV is parked through the manual driving", as the registration intended parking position. In other words, when the registration button G3a2 is tapped, the VCECU selects/employs a manual parking registration method.

The operation of the present apparatus (i) when the registration button G3a1 for registering an automatic parking position is tapped will be firstly described. Then, the operation of the present apparatus (ii) when the registration button G3a2 for registering a driver parking position is tapped will be next described.

(i): When the registration button G3a1 for registering an automatic parking position is tapped.

Figure 6:
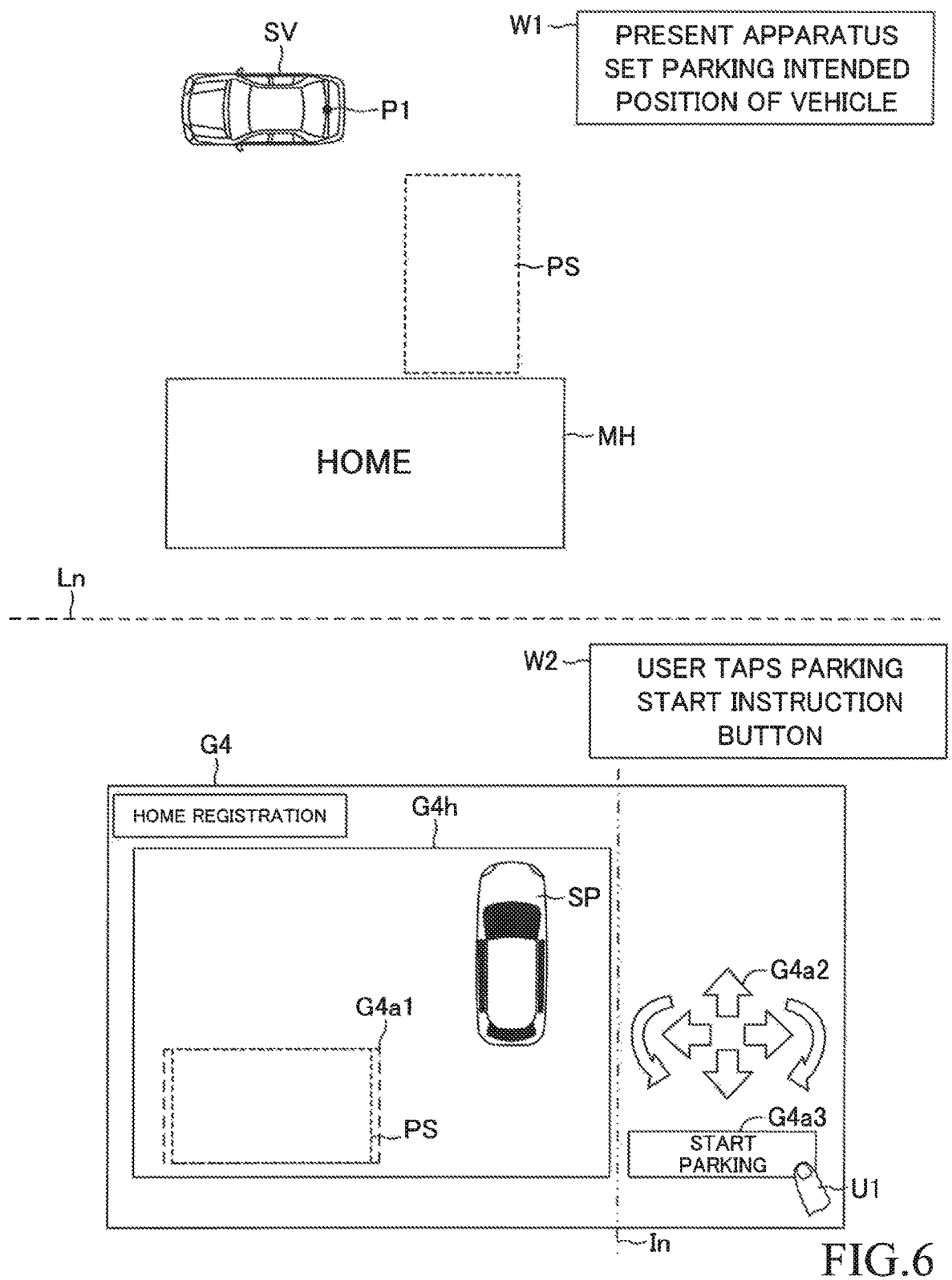
FIG. 6 illustrates the operation of the parking support apparatus and a display image displayed on the display part when registering the parking position.

In this case, the VCECU displays a display image G4 shown in the lower part of FIG. 6 on the touchscreen display part 22. The display image G4 includes an overhead view image G4h within the left side section thereof. A first display frame G4a1 (registration intended parking position frame G4a1) which indicates the registration intended parking position is superimposed on the overhead view image G4h. The display image G4 also includes "a position operation button G4a2 and a parking start instruction button G4a3" within the right side section thereof. The position operation button G4a2 comprises six arrow buttons including an upward arrow, a downward arrow, a leftward arrow, a rightward arrow, a clockwise arrow, and a counterclockwise arrow.

The first display frame G4a1 (registration intended parking position frame G4a1) indicates "the registration intended parking position". The position operation button G4a2 is a button to be tapped/operated by the user in order for the user to move/shift a position of the first display frame G4a1 within the overhead view image G4h.

When any one of the upward arrow, the downward arrow, the leftward arrow, and the rightward arrow is tapped once, the first display frame G4a1 is moved/shifted in a direction corresponding to (indicated by) the tapped arrow by a predetermined distance, on/within the overhead view image G4h. When any one of the clockwise arrow and the counterclockwise arrow is tapped once, the first display frame G4a1 is moved/rotated in a turning direction corresponding to (indicated by) the tapped arrow by a predetermined angle around the center point of the first display frame G4a1, on/within the overhead view image G4h.

The parking start instruction button G4a3 is a button to be tapped/operated by the user in order for the user to provisionally/tentatively determine "a position indicated by the first display frame G4a1" as "the registration intended parking position" and to start moving automatically the vehicle SV (or to start to perform the automatic parking control) toward the position indicated by (corresponding to) the first display frame G4a1.

When the parking start instruction button G4a3 is tapped, the VCECU performs the automatic parking control for moving the vehicle SV automatically toward "the registration intended parking position" which has been provisionally/tentatively determined. The automatic parking control in this case is sometimes referred to as a "pre-registration (or before registration) automatic parking control" because this control is performed before the registration intended parking position has been actually registered on/with the VCECU.

Figure 7:
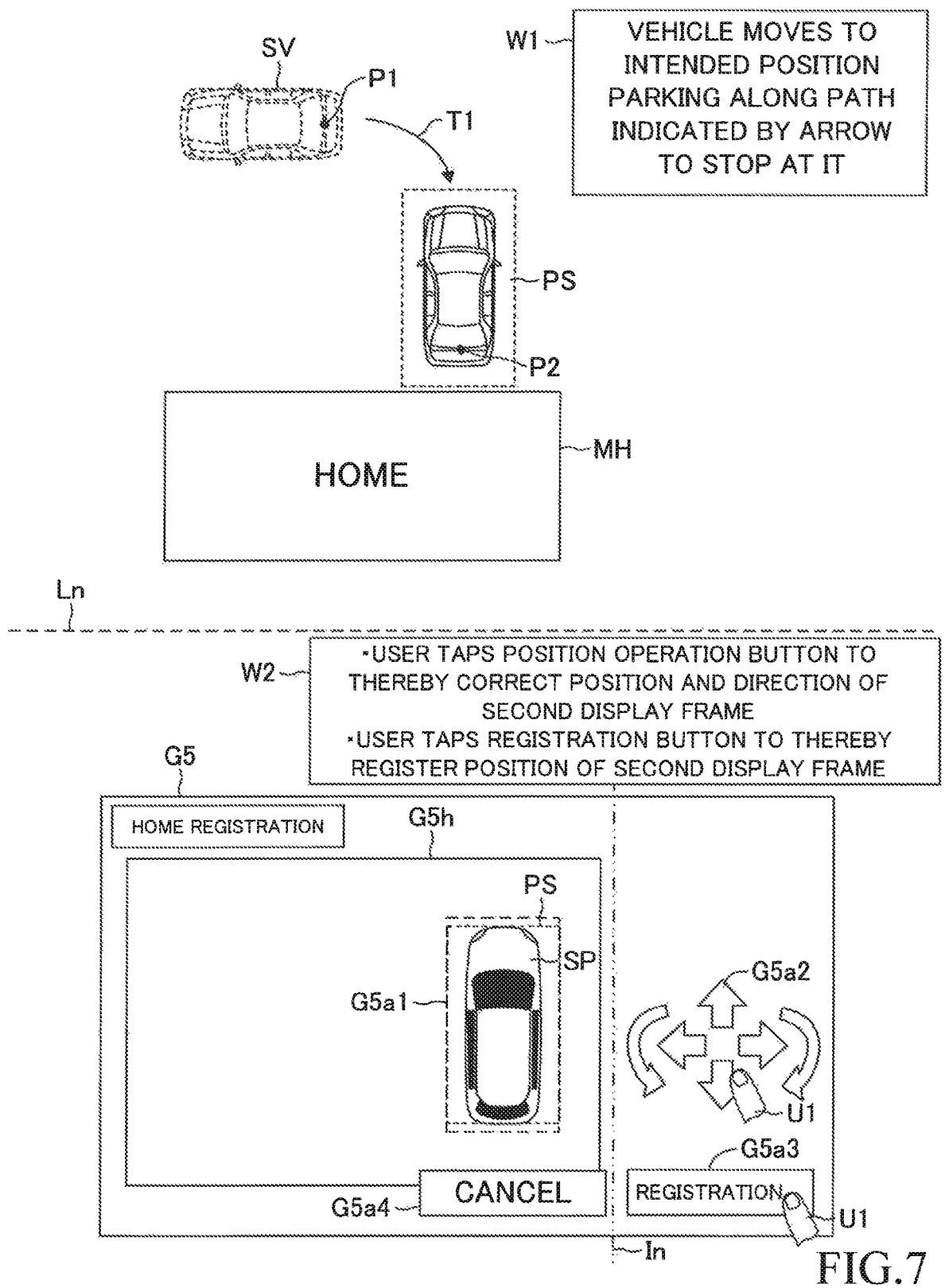
FIG. 7 illustrates the operation of the parking support apparatus and a display image displayed on the display part when registering the parking position.

More specifically, as shown in the upper part of FIG. 7, the VCECU determines/calculates, as a target path T1, a path for moving the vehicle SV from the current position (a position represented by the point P1) to the registration intended parking position (a position represented by the point P2) without letting the vehicle SV contact any obstacles. That is, the VCECU specifies/determines a positional relationship between the position (the current position) of the vehicle SV at the current time point and the registration intended parking position. Thereafter, the VCECU calculates the target path T1 on/along which the vehicle SV can move/travel from the position of the vehicle SV at the current time point to the registration intended parking position. The VCECU determines "a movement direction (for example, the position of the shift lever 72), a steering angle pattern, and a speed pattern" for moving the vehicle SV on/along the target path T1. The VCECU performs the automatic shift position control to change the position of the shift lever 72 (a state of "transmission and/or driving-direction switching mechanism") in accordance with the determined position of the shift lever 72. Thereafter, the VCECU performs the automatic steering angle control, the automatic driving force control, the automatic braking force control, in such a manner that the vehicle SV travels/moves in accordance with the determined steering angle pattern and the determined speed pattern.

While the vehicle SV is automatically being moved toward the registration intended parking position, the VCECU obtains the IDs of the feature points and the feature point information on the feature points from the PVM-ECU 20 so as to store them in the non-volatile memory of the VCECU, every time the predetermined time elapses.

When the vehicle SV reaches the registration intended parking position (the position represented by the point P2) and stops there, the VCECU switches the images displayed on the touchscreen display part 22 from the display image G4 shown in the lower part of FIG. 6 to the display image G5 shown in the lower part of FIG. 7. The display image G5 includes "an overhead view image G5h and a registration cancel button G5a4", within the left side section thereof. A second display frame G5a1 for indicating a "final registration intended parking position" is superimposed on the overhead view image G5h. Furthermore, the display image G5 includes "a position operation button G5a2 and a registration button G5a3", within the right side section thereof.

The second display frame G5a1 indicates the "registration intended parking position" to be finally registered, which is referred to as the final registration intended parking position. The position operation button G5a2 is a button similar to the position operation button G4a2. That is, the position operation button G5a2 is a button to be tapped in order for the user to move/shift a position of the second display frame G5a1 on/within the overhead view image G5h. A registration button G5a3 is a button to be tapped in order for the user to cause the VCECU to register (store in its memory) "the final registration intended parking position" indicated by the second display frame G5a1 as the registered parking position. The registration cancel button G5a4 is a button to be tapped in order for the user to cause the VCECU to cancel registering "the final registration intended parking position" indicated by the second display frame G5a1 as the registered parking position.

The user taps the position operation button G5a2 to thereby move/shift the position of the second display frame G5a1 on/in the overhead view image G5h, as appropriate. That is, the user can make a fine adjustment of the final registration intended parking position using the position operation button G5a2. Thereafter, the user taps the registration button G5a3.

When the registration button G5a3 is tapped, the VCECU determines "the registration intended parking position" indicated by the second display frame G5a1 at that time point (i.e., a time point at which the registration button G5a3 is tapped) as the final registered parking position. Then, the VCECU stores information specifying the determined final registered parking position in the non-volatile memory (in other words, the VCECU registers the determined registered parking position on the VCECU).

Figure 8:
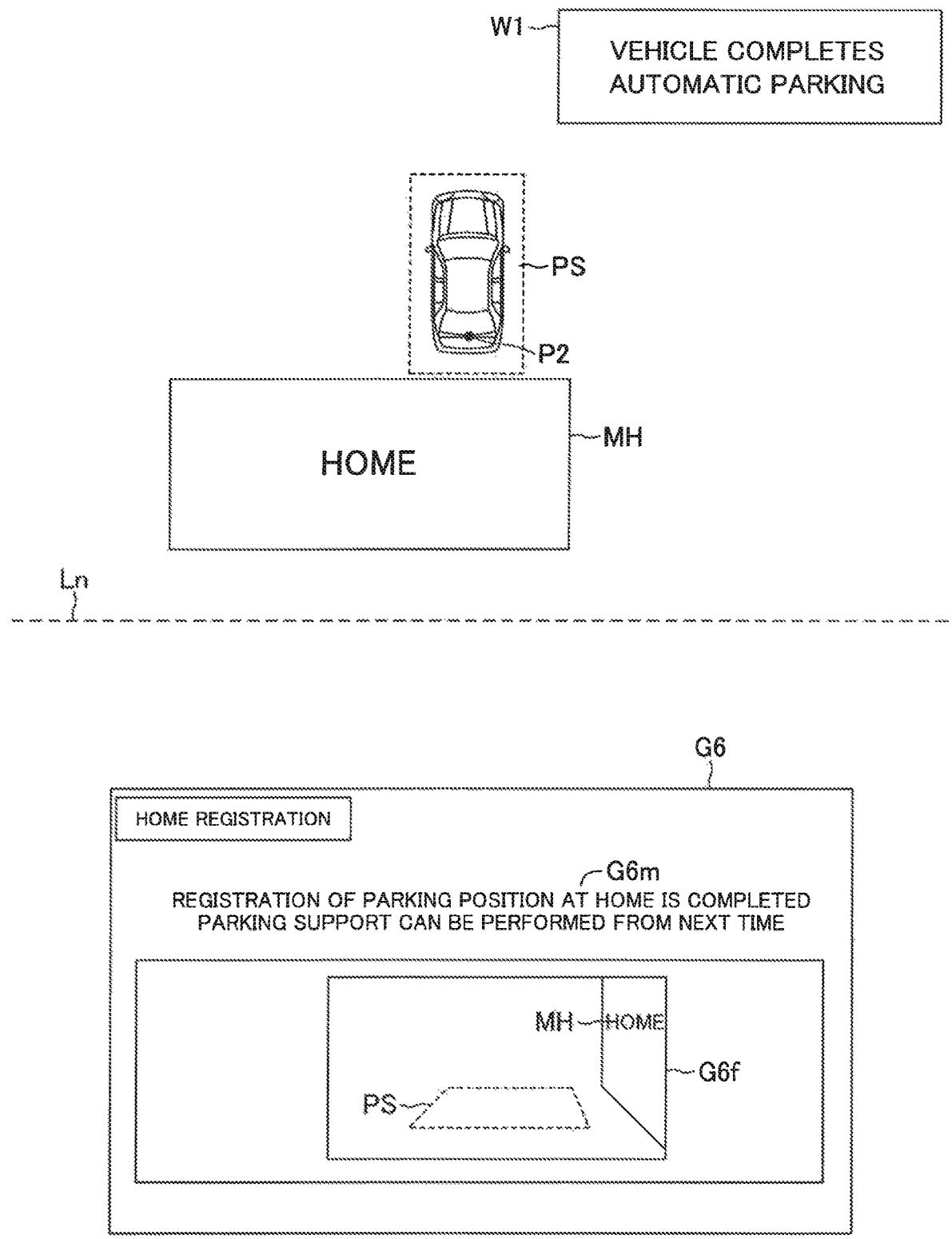
FIG. 8 illustrates the operation of the parking support apparatus and a display image displayed on the display part when registering the parking position.

Thereafter, the VCECU switches the images displayed on the touchscreen display part 22 from the display image G5 to the display image G6 shown in the lower part of FIG. 8. The display image G6 includes a registration completion message G6m and an image G6f which indicates (corresponds to) the registered parking position. The registration completion message G6m is a message for informing the user that the registration of the intended parking position has just been completed. The image G6f is the camera viewpoint image of the back camera 21b when viewing the registered parking position from the position of the vehicle SV at a time point at which the parking start instruction button G4a3 was tapped, the parking start instruction button G4a3 being shown in the lower part of FIG. 6. A frame indicating the registered parking position is superimposed on the camera viewpoint image of the image G6f. In the above manner, when the registration button G3a1 of the automatic parking position is tapped, the registration of the intended parking position is completed using the automatic parking control.

(ii): When the registration button G3a2 (refer to FIG. 5) for registering a driver parking position is tapped.

Figure 5:
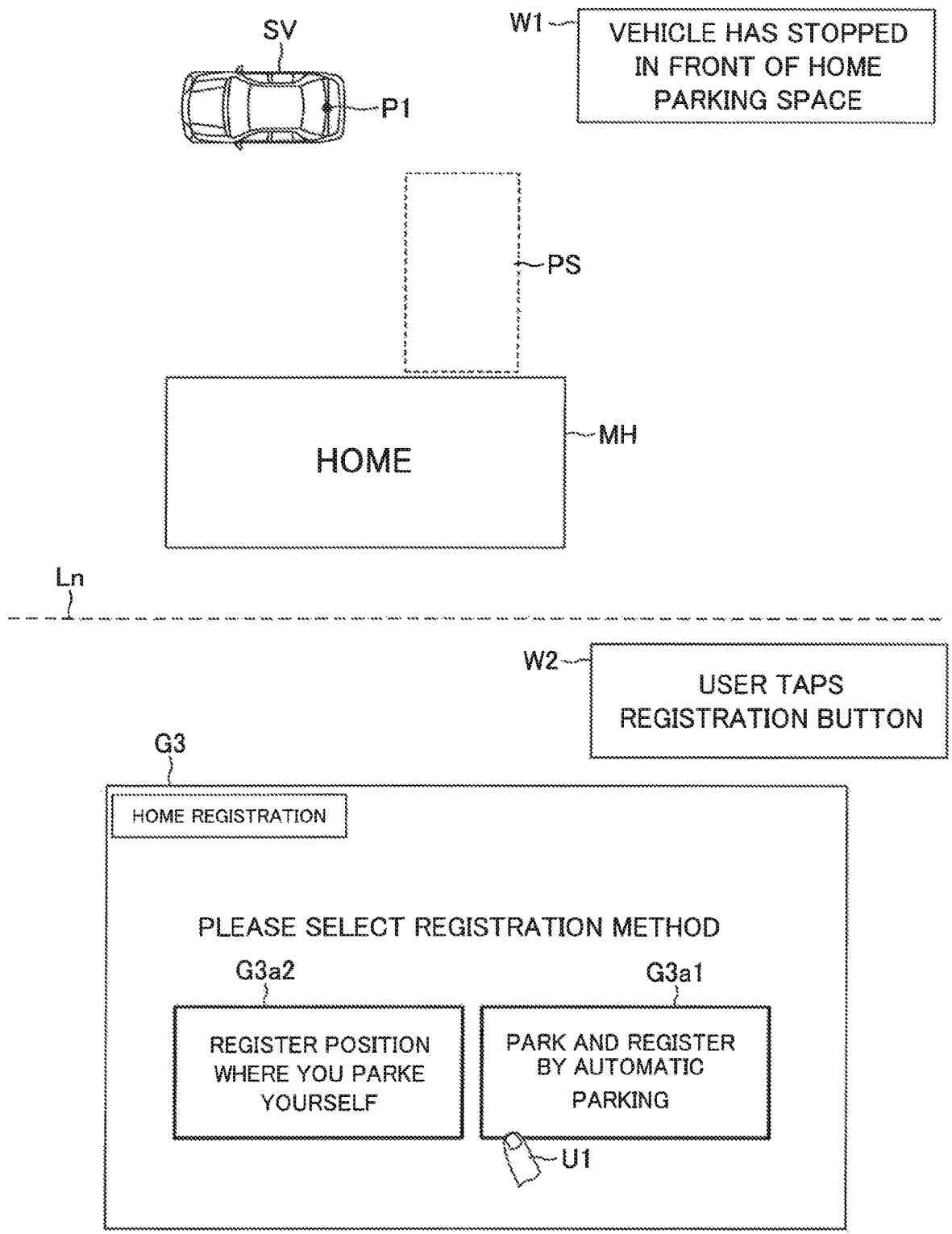
FIG. 5 illustrates the operation of the parking support apparatus and a display image displayed on the display part when registering the parking position.
Figure 9:
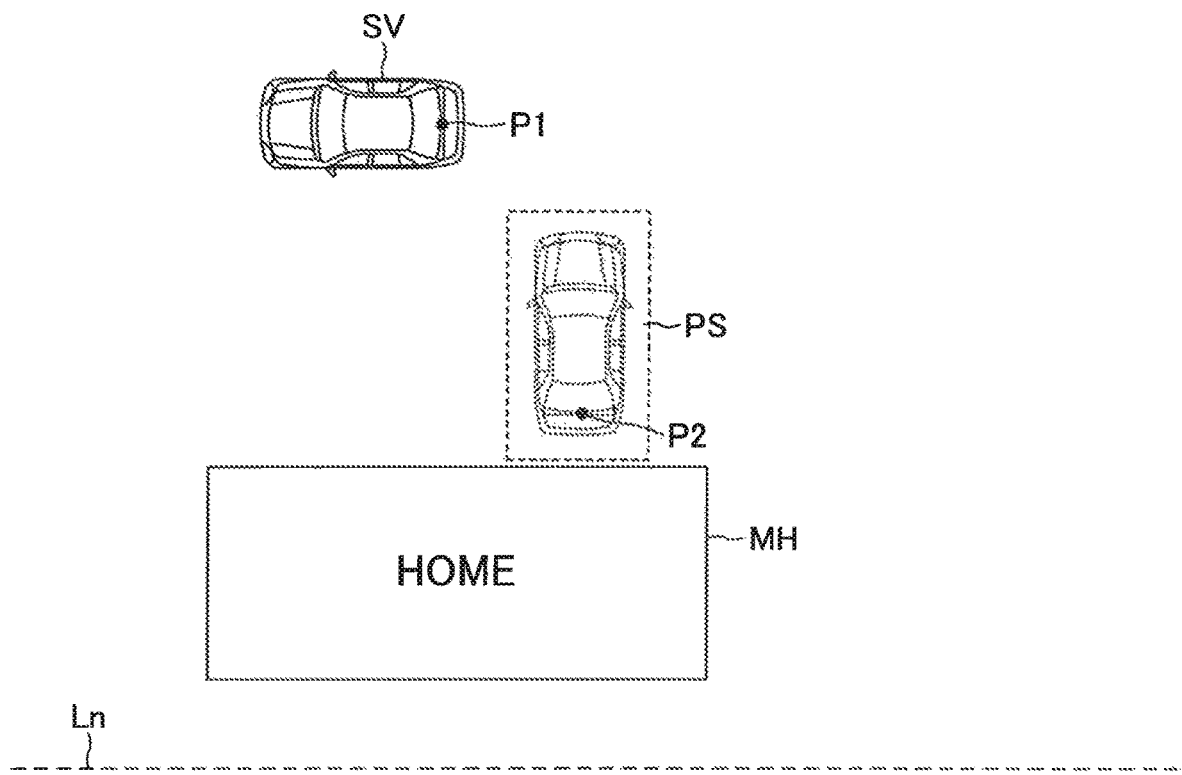
FIG. 9 illustrates the operation of the parking support apparatus and a display image displayed on the display part when registering the parking position.
Figure 9:
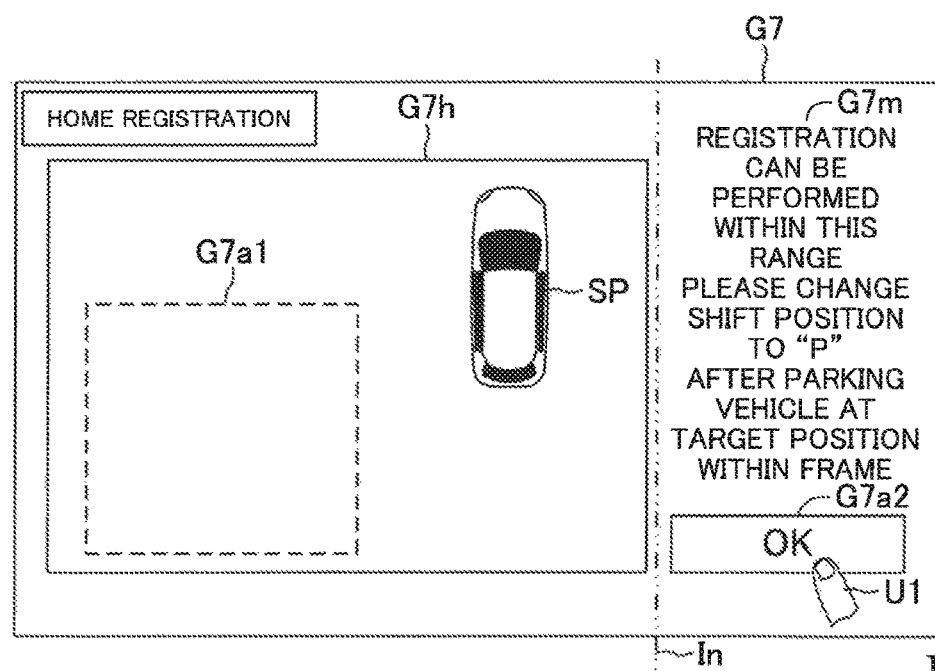

In this case, the VCECU switches the images displayed on the touchscreen display part 22 from the display image G3 shown in the lower part of FIG. 5 to the display image G7 shown in the lower part of FIG. 9. The display image G7 includes an overhead view image G7h within the left side section thereof. That overhead view image G7h includes a registration capable area frame G7a1. The display image G7 includes "a message G7m and a registration process start button G7a2" within the right side section thereof.

The registration capable area frame G7a1 indicates a range (an area) including all of the parking positions which is capable of being registered. The message G7m is an instruction message for the user. The registration process start button G7a2 for the driver parking position is a button to be tapped by the user, when the user decides to start a series of processes (the manual parking registration method) for registering the driver parking position.

After the user taps the registration process start button G7a2, the user performs the manual driving parking. That is, after tapping the registration process start button G7a2, the user moves/drives the vehicle SV by himself/herself (or by the driver's own driving operation) to "a parking position which the user wants to register (refer to a position represented by the point P2)" and stops the vehicle SV at that parking position. In this case as well, the VCECU obtains the IDs of the feature points and the feature point information on the feature points from the PVM ECU 20 to store them in the non-volatile memory, while the vehicle SV is moving toward "the parking position which the user wants to register", every time the predetermined time elapses.

When the user stops the vehicle SV at "the parking position which the user wants to register", the user changes the positions of the shift lever 72 from the reverse position (R) to the parking position (P). This causes the VCECU to determine/recognize that the parking of the vehicle SV is completed. At this time point, the VCECU switches the images displayed on the touchscreen display part 22 from the display image G7 to the above-described display image G5 shown in the lower part of FIG. 7. In this case, the second display frame G5*a*1 is displayed at "a position in the overhead view image G5*h*" which corresponds to the position at which the vehicle SV has actually stopped. Thereafter, the processes of the registration of the parking position are performed as in the manner described above.

That is, the position of the second display frame G5*a*1 in the overhead view image G5*h* is moved (corrected/adjusted) in response to the user's touch operation (tap) onto the position operation button G5*a*2. When the registration button G5*a*3 is tapped, the VCECU determines "the registration intended parking position" indicated by the second display frame G5*a*1 at that time point (i.e., a time point at which the registration button G5*a*3 is tapped) as the final registered parking position. Then, the VCECU stores information specifying the determined final registered parking position in the non-volatile memory (in other words, the VCECU registers the determined registered parking position on the VCECU). In the above manner, when the registration button G3*a*2 for registering a driver parking position is tapped, the registration of the intended parking position is completed (without using the automatic parking control).

(Automatic Parking Control Performed Post-Registration of Intended Parking Position)

Once the intended parking position has been registered as the registered parking position, the user is allowed to automatically park the vehicle SV at/into the registered parking position (i.e., let the automatic parking perform) through the automatic parking control. It should be noted that the automatic parking control in this case is referred to as the "post-registration (or after-registration) automatic parking control" for convenience.

More specifically, the user (the driver) stops the vehicle SV at a predetermined position around (in the vicinity of) the registered parking position, operates the parking support switch 14, and taps the above-described parking request switch. At this time, if it is determined that the vehicle SV has the registered parking position (i.e., the registered parking position has been registered on the VCECU of the vehicle SV), the "post-registration automatic parking control" starts. The post-registration automatic parking control includes processes for parking the vehicle SV automatically into/at the registered parking position.

In this case as well, while the vehicle SV is being moved toward the registered parking position, the VCECU obtains the IDs of the feature points and the feature point information on the feature points from the PVM ECU 20, every time the predetermined time elapses. Hereinafter, the feature points obtained in this state are referred to as "actual feature points". Thereafter, the VCECU specifies a position of the vehicle SV at the current time point and the registered parking position, based on "the feature point information on the actual feature points" and "the feature point information on the feature points that were stored in the non-volatile memory when the VCECU registered the intended parking position". Then, the VCECU calculates a path (i.e., the target path) along/on which the vehicle SV can move without contacting the obstacles from the specified position of the vehicle SV at the current time point to the registered parking position.

Thereafter, similarly to the above, the VCECU performs the automatic shift position control, the automatic steering angle control, the automatic driving force control, and the automatic braking force control in such a manner that the vehicle SV moves automatically along the target path. The above description is the outline of the "post-registration automatic parking control". It should be noted that the automatic parking control itself using the feature points is well known (for example, refer to Japanese Patent Application Laid-Open No. 2017-21427, Japanese Patent Application Laid-Open No. 2017-138664, and Japanese Patent Application Laid-Open No. 2018-127065).

When the "post-registration automatic parking control" is performed, the moving path of when the vehicle SV is moved automatically to the registered parking position has a high possibility of coinciding with all or part of a path (hereinafter, referred to as a "on-registration moving path") of when the vehicle SV was automatically moved to the registered parking position owing to the pre-registration automatic parking control for registering the registered parking position. The on-registration moving path is a path along/on which the vehicle SV was actually and successfully moved to the registered parking position by the pre-registration automatic parking control, and is thus unlikely to include a place through which the vehicle is difficult to travel/pass. Therefore, when the post-registration automatic parking control is performed, the vehicle SV is highly likely to be able to be automatically moved to the registered parking position. Accordingly, the VCECU can reduce a possibility that the vehicle SV cannot be automatically moved to and parked at the registered parking position which has been registered.

<Specific Operation>

Figure 10:
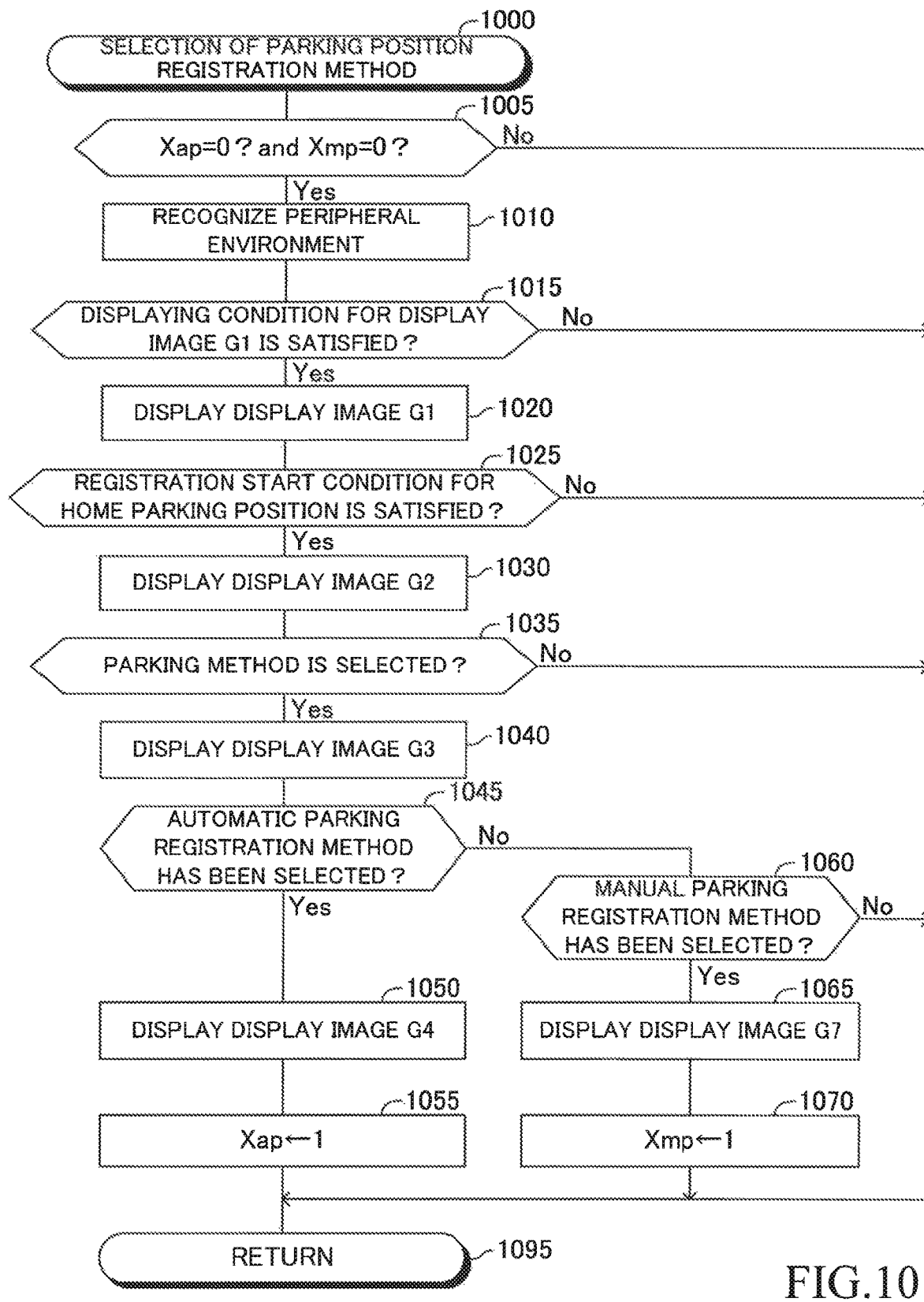
FIG. 10 is a flowchart showing a routine executed by a CPU of a vehicle control ECU shown in FIG. 1.

The CPU of the VCECU is configured to execute a routine represented by a flowchart shown in FIG. 10, every time a predetermined time elapses.

Therefore, when a predetermined time arrives, the CPU starts processing from step 1000 of FIG. 10, and proceeds to step 1005 to determine whether or not both of a value of an automatic parking position registration flag Xap (a flag Xap) and a value of a driver parking position registration flag Xmp (a flag Xmp) are "0".

The flag Xap indicates, when its value is "1", that the automatic parking registration method has been selected owing to the user's touch operation to the registration button G3*a*1 for registering an automatic parking position. The flag Xmp indicates, when its value is "1", that the manual parking registration method has been selected owing to the user's touch operation to the registration button G3*a*2 for registering a driver parking position. It should be noted that each of the values of those flags (Xap and Xmp) is set to "0" through an initialization routine (not shown) executed by the CPU when an ignition key switch (not shown) of the vehicle SV is changed from an OFF position to an ON position.

When any one of the values of those flags (Xap and Xmp) is not "0" (that is, at least one of those values is "1"), the CPU makes a "No" determination at step 1005, and proceeds to step 1095 to tentatively terminate the present routine.

In contrast, when both of the values of those flags (Xap and Xmp) are "0", the CPU makes a "Yes" determination at step 1005, and proceeds to step 1010 to recognize a peripheral environment (i.e., the surroundings of the vehicle SV).

More specifically, the CPU generates data indicative of "positions with respect to the vehicle SV and shapes" of "three-dimensional objects, space, and parking frame lines" present around (in the vicinity of) the vehicle SV, based on the information transmitted from the radar sensor 11, the first ultrasonic sensor 12, the second ultrasonic sensor 13, the camera 21, and the PVM-ECU 20. The CPU obtains the generated data as the generated vehicle peripheral information.

Thereafter, the CPU proceeds to step 1015 to determine whether or not a displaying condition for the display image G1 is satisfied. The displaying condition for the display image G1 is a condition to be satisfied when all of the following conditions A1 to A3 are satisfied.

Condition A1: the condition A1 is a condition to be satisfied when the vehicle SV is stopped (the vehicle SV is not moving).

Condition A2: the condition A2 is a condition to be satisfied when the space in which the vehicle SV can be parked is detected based on the vehicle peripheral information.

Condition A3: the condition A3 is a condition to be satisfied when the above-described parking request switch (not shown) is tapped (touched).

When the displaying condition for the display image G1 is not satisfied, the CPU makes a "No" determination at step 1015, and proceeds to step 1095 to tentatively terminate the present routine.

In contrast, when the displaying condition for the display image G1 is satisfied, the CPU makes a "Yes" determination at step 1015, and proceeds to step 1020 to display the display image G1. Thereafter, the CPU proceeds to step 1025 to determine whether or not the display button G1a1 for a home parking position registration has been tapped. That is, the CPU determines whether or not a registration start condition for the home parking position is satisfied.

When the registration start condition for a home parking position is not satisfied, the CPU makes a "No" determination at step 1025, and proceeds to step 1095 to tentatively terminate the present routine.

In contrast, when the display button G1a1 is tapped so that the registration start condition for a home parking position is satisfied, the CPU makes a "Yes" determination at step 1025, and proceeds to step 1030 to display the display image G2. Thereafter, the CPU proceeds to step 1035 to determine whether or not the user has tapped any one of the first to fourth parking method selection buttons G2a1 to G2a4. In other words, the CPU determines whether or not the parking method which should be performed has been selected from among the left perpendicular parking, the right perpendicular parking, the left parallel parking, and the right parallel parking.

When the parking method has not been selected, the CPU makes a "No" determination at step 1035, and proceeds to step 1095 to tentatively terminate the present routine.

In contrast, when the parking method which should be performed has been selected, the CPU makes a "Yes" determination at step 1035, and proceeds to step 1040 to display the display image G3. Thereafter, the CPU proceeds to step 1045 to determine whether or not the user has tapped the registration button G3a1 for registering an automatic parking position. That is, the CPU determines whether or not the automatic parking registration method has been selected.

When the automatic parking registration method has been selected, the CPU makes a "Yes" determination at step 1045, and sequentially executes the processes of steps 1050 and 1055 described below, and then, proceeds step 1095 to tentatively terminate the present routine.

Step 1050: the CPU displays the display image G4.

Step 1055: the CPU sets the value of the flag Xap to "1".

In contrast, when the automatic parking registration method has not been selected, the CPU makes a "No" determination at step 1045 and proceeds to step 1060 to determine whether or not the user has tapped the registration button G3a2. That is, the CPU determines whether or not the manual parking registration method has been selected.

When the manual parking registration method has been selected, the CPU makes a "Yes" determination at step 1060, and sequentially executes the processes of steps 1065 and 1070 described below, and then, proceeds to step 1095 to tentatively terminate the present routine.

Step 1065: the CPU displays the display image G7.

Step 1070: the CPU sets the value of the flag Xmp to "1".

When the manual parking registration method has not been selected, the CPU makes a "No" determination at step 1060 and proceeds to step 1095 to tentatively terminate the present routine.

Figure 11:
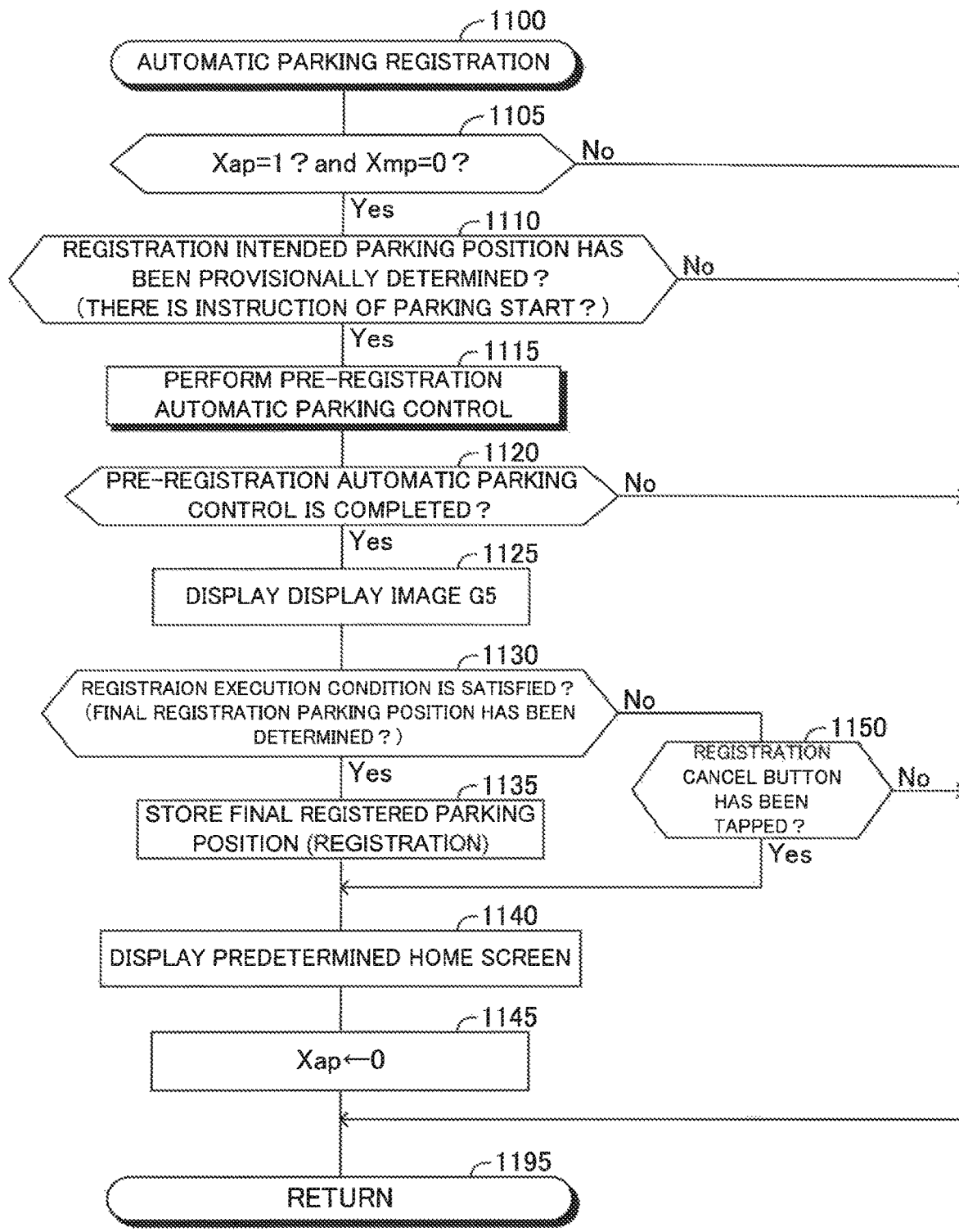
FIG. 11 is a flowchart showing a routine executed by the CPU of the vehicle control ECU shown in FIG. 1.

Furthermore, the CPU executes a routine represented by a flowchart shown in FIG. 11, every time a predetermined time elapses.

Therefore, when a predetermine timing arrives, the CPU starts processing from step 1100 shown in FIG. 11, and proceeds to step 1105 to determine whether or not the value of the flag Xap is "1" and the value of the flag Xmp is "0".

When the value of the flag Xap is "0" or when the value of the flag Xmp is "1", the CPU makes a "No" determination at step 1105, and proceeds to step 1195 to tentatively terminate the present routine.

In contrast, when the value of the flag Xap is "1" and the value of the flag Xmp is "0", the CPU makes a "Yes" determination at step 1105 to proceed to step 1110. At step 1110, the CPU determines whether or not the user has tapped the parking start instruction button G4a3. That is, the CPU determines whether or not the registration intended parking position has been provisionally/tentatively determined. It should be noted that when the user taps/touches the position operation button G4a2 in a period between a time point at which the display image G4 starts to be displayed and a time point at which the parking start instruction button G4a3 is tapped, the CPU moves/shifts the first display frame G4a1 (registration intended parking position frame G4a1) in accordance with the touch operation to the position operation button G4a2 as described above.

When the registration intended parking position has not been provisionally/tentatively determined, the CPU makes a "No" determination at step 1110, and proceeds to step 1195 to tentatively terminate the present routine.

In contrast, the registration intended parking position has been provisionally/tentatively determined, the CPU makes a "Yes" determination at step 1110 and proceeds to step 1115 to perform the pre-registration automatic parking control in accordance with the parking method selected at step 1035. It should be noted that when the pre-registration automatic parking control is being performed at a time point at which each of the processes of steps 1105 and 1110 is executed, the CPU proceeds to step 1115 to continue performing the pre-registration automatic parking control.

Thereafter, the CPU proceeds to step 1120 to determine whether or not the pre-registration automatic parking control is completed (i.e., whether or not the vehicle SV has stopped at the registration intended parking position which has been provisionally/tentatively determined).

When the pre-registration automatic control has not been completed at the current time point, the CPU makes a "No" determination at step 1120, and proceeds to step 1195 to tentatively terminate the present routine.

When the pre-registration automatic parking control has been completed at the current time point, the CPU makes a "Yes" determination at step 1120, and proceeds to step 1125 to display the display image G5. Thereafter, the CPU proceeds to step 1130 to determine whether or not the user has tapped the registration button G5a3. That is, the CPU determines whether or not "the registration intended parking position" indicated by the second display frame G5a1 has been determined as the final registered parking position. It should be noted that when the user taps/touches the position operation button G5a2 in a period between a time point at which the display image G5 starts to be displayed and a time point at which the registration button G5a3 is tapped, the CPU moves/shifts the second display frame G5a1 (registration intended parking position frame G5a1) in accordance with the touch operation to the position operation button G5a2 as described above.

When the "registration intended parking position" has been determined as the final registered parking position, the CPU makes a "Yes" determination at step 1130, and sequentially executes the processes of steps 1135 to 1145 described below, and proceeds to step 1195 to tentatively terminate the present routine.

Step 1135: the CPU stores the information specifying the final registered parking position in the non-volatile memory to complete the registration of the intended parking position.

It should be noted that the information specifying the final registered parking position is stored in the non-volatile memory together with the feature points which have been obtained under the execution of the pre-registration automatic parking control, the feature points being made to be related/linked/associated to/with the final registered parking position.

Step 1140: the CPU displays an unillustrated predetermined home/top screen on the touchscreen display part 22.

Step 1145: the CPU sets the value of the flag Xap to "0".

Meanwhile, when "the registration intended parking position" has not been determined as "the final registered parking position" at a time point at which the CPU executes the process of step 1130, the CPU makes a "No" determination at step 1130 to proceed to step 1150. At step 1150, the CPU determines whether or not the registration cancel button G5a4 has been tapped.

When the registration cancel button G5a4 has been tapped, the CPU makes a "Yes" determination at step 1150, sequentially executes the above-described processes of "step 1140 and step 1145", and proceeds to step 1195 to tentatively terminate the present routine. In this case, the information specifying the final registered parking position is not stored (that is, the final registered parking position is not registered). In contrast, when the registration cancel button G5a4 has not been tapped, the CPU makes a "No" determination at step 1150, and proceeds to step 1195 to tentatively terminate the present routine.

Figure 12:
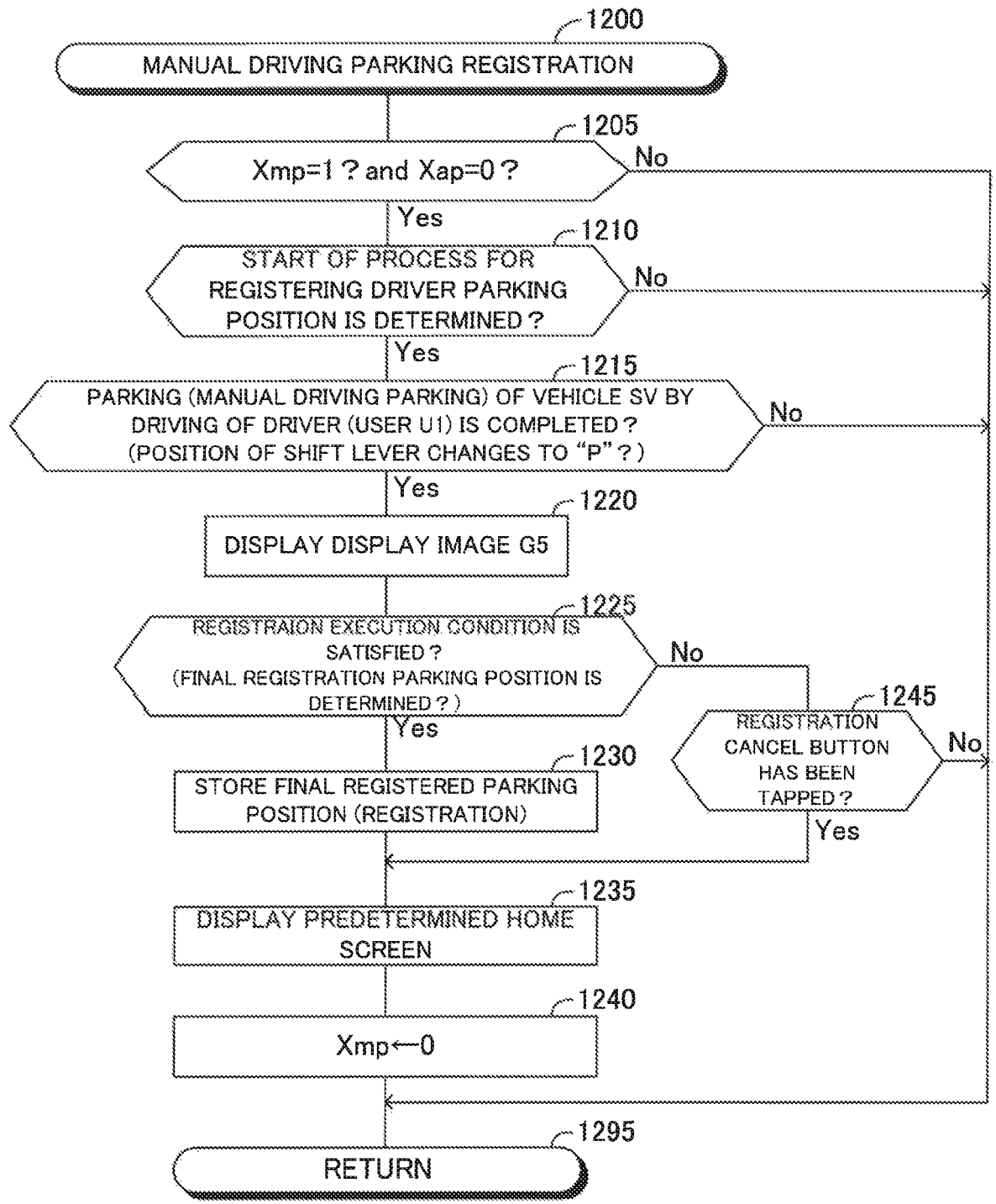
FIG. 12 is a flowchart showing a routine executed by the CPU of the vehicle control ECU shown in FIG. 1.

Furthermore, the CPU executes a routine represented by a flowchart shown in FIG. 12, every time a predetermined time elapses.

Therefore, when a predetermined timing arrives, the CPU starts processing from step 1200 shown in FIG. 12, and proceeds to step 1205 to determine whether or not the value of the flag Xmp is "1" and the value of the flag Xap is "0".

When the determination condition at step 1205 is not satisfied, the CPU makes a "No" determination at step 1205, and proceeds to step 1295 to tentatively terminate the present routine.

In contrast, when the value of the flag Xmp is "1" and the value of the flag Xap is "0", the CPU makes a "Yes" determination at step 1205, and proceeds to step 1210 to determine whether or not the user has tapped the registration process start button G7a2 for the driver parking position (refer to the lower part of FIG. 9). That is, the CPU determines whether or not the process for registering the driver parking position is allowed to be started.

When the registration process start button G7a2 has not been tapped, the CPU makes a "No" determination at step 1210, and proceeds to step 1295 to tentatively terminate the present routine.

In contrast, when the registration process start button G7a2 has been tapped, the CPU makes a "Yes" determination at step 1210, and proceeds to step 1215. At step 1215, the CPU determines whether or not the parking (the manual driving parking) of the vehicle SV by the driver's (i.e., user's) own driving operation has been completed at the current time point. More specifically, when the position of the vehicle SV is within the area indicated/defined by the registration capable area frame G7a1 and the position of the shift lever 72 has been changed to the "P (P range)" from "R (R range) other than P)", the CPU determines that the parking of the vehicle SV by the driver's own operation has completed.

When the manual driving parking has not completed, the CPU makes a "No" determination at step 1215, and proceeds to step 1295 to tentatively terminate the present routine.

Meanwhile, when the manual driving parking has completed, the CPU makes a "Yes" determination at step 1215, and proceeds to step 1220 to display the display image G5. Thereafter, the CPU proceeds to step 1225 to determine whether or not the user has tapped the registration button G5a3. That is, the CPU determines whether or not "the registration intended parking position" indicated by the second display frame G5a1 has been determined as the final registered parking position. In this case as well, when the user taps the position operation button G5a2 in a period between a time point at which the display image G5 starts to be displayed and a time point at which the registration button G5a3 is tapped, the CPU moves/shifts the second display frame G5a1 (registration intended parking position frame G5a1) in accordance with the touch operation to the position operation button G5a2 as described above.

When "the registration intended parking position" has been determined as the final registered parking position, the CPU makes a "Yes" determination at step 1225, and sequentially executes the processes of steps 1230 and 1240. Thereafter, the CPU proceeds to step 1295 to tentatively terminate the present routine.

Step 1230: the CPU stores the information specifying the final registered parking position in the non-volatile memory to complete the registration of the intended parking position.

It should be noted that the final registered parking position is stored in the non-volatile memory together with the feature points which have been obtained under the execution of the manual driving parking, the feature points being made to be related to the final registered parking position.

Step 1235: the CPU displays the unillustrated predetermined home/top screen on the touchscreen display part 22.

Step 1240: the CPU sets the value of the flag Xmp to "0".

Meanwhile, when "the registration intended parking position" has not been determined as the final registered parking position at a time point at which the CPU executes the process of step 1225, the CPU makes a "No" determination at step 1225 to proceed to step 1245. At step 1245, the CPU determines whether or not the registration cancel button G5*a*4 has been tapped.

When the registration cancel button G5*a*4 has been tapped, the CPU makes a "Yes" determination at step 1245, and executes the processes of the above-described "step 1235 and step 1240". Thereafter, the CPU proceeds to step 1295 to tentatively terminate the present routine. In contrast, when the registration cancel button G5*a*4 has not been tapped, the CPU makes a "No" determination at step 1245, and proceeds to step 1295 to tentatively terminate the present routine.

Figure 13:
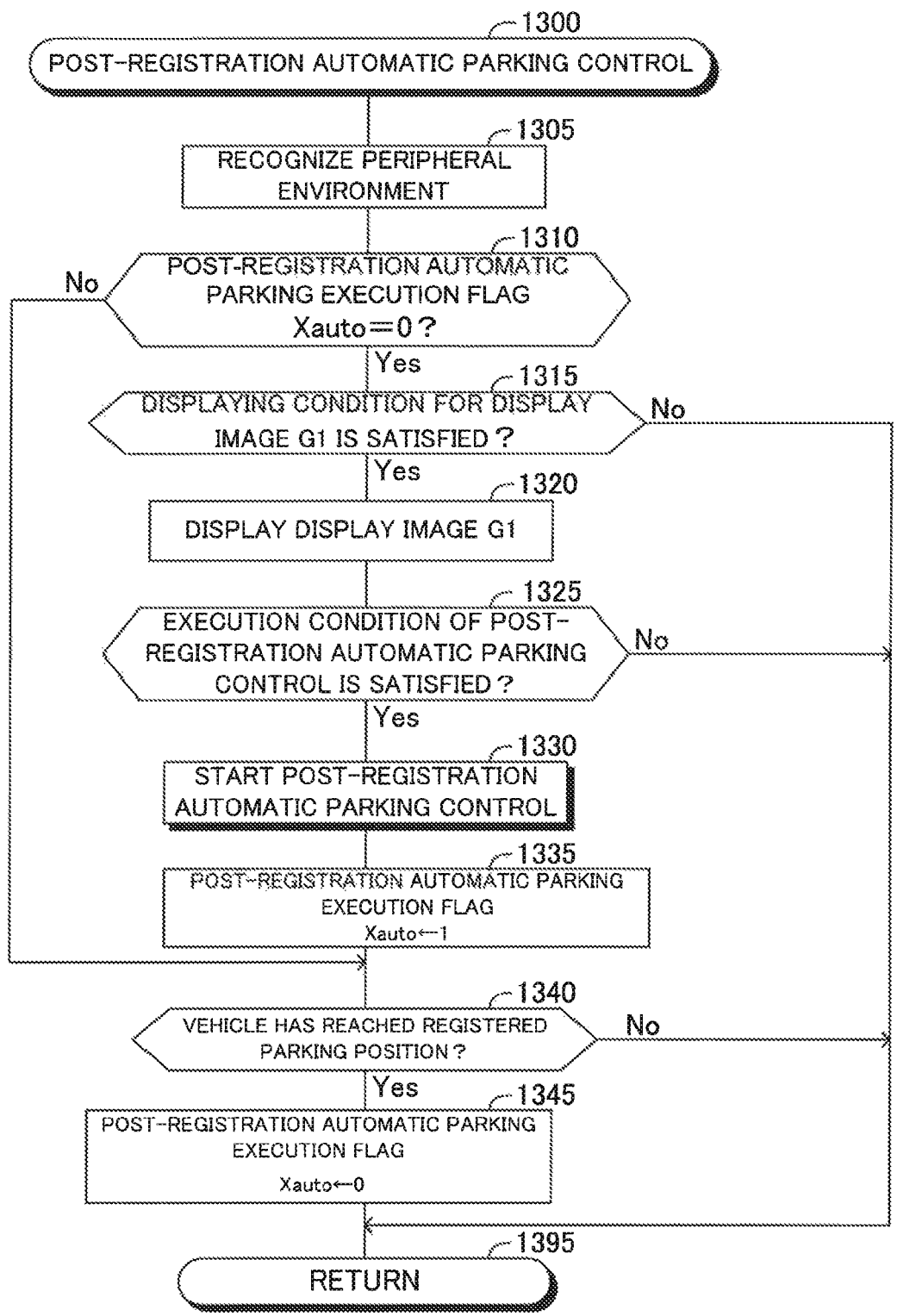
FIG. 13 is a flowchart showing a routine executed by the CPU of the vehicle control ECU shown in FIG. 1.

Furthermore, the CPU executes a routine represented by a flowchart shown in FIG. 13, every time a predetermined time elapses.

Therefore, when a predetermined timing arrives, the CPU starts processing from step 1300 shown in FIG. 13, and proceeds to step 1305 to execute the process similar to the process of step 1010 shown in FIG. 10 to thereby recognize the surroundings (peripheral environment) of the vehicle SV. That is, the CPU obtains the vehicle peripheral information.

Thereafter, the CPU proceeds to step 1310 to determine whether or not the value of a post-registration automatic parking execution flag Xauto (a flag Xauto) is "0". The value of the flag Xauto is also set to "0" through the above-described initialization routine.

When the value of the flag Xauto is "0", the CPU makes a "Yes" determination at step 1310, and proceeds to step 1310 to determine whether or not the above-described displaying condition for the display image G1 is satisfied. When the displaying condition for the display image G1 is not satisfied, the CPU makes a "No" determination at step 1315, and proceeds to step 1395 to tentatively terminate the present routine.

In contrast, when the displaying condition for the display image G1 is satisfied, the CPU makes a "Yes" determination at step 1315, and proceeds to step 1320 to display the display image G1. In this case, if the registered parking position is detected within the space in which the vehicle SV can be parked, based on the vehicle peripheral information, the CPU additionally displays "the execution button for performing a post-registration" within the display image G1.

Thereafter, the CPU proceeds to step 1325 to determine whether or not an execution condition of the post-registration automatic parking control is satisfied. The execution condition of the post-registration automatic parking control is a condition to be satisfied when both of the following conditions B1 and B2 are satisfied.

Condition B1: the condition B1 is a condition to be satisfied when the parking support switch 14 has been operated.

Condition B2: the condition B2 is a condition to be satisfied when the "execution button for performing a post-registration" has been tapped/touched.

When the execution condition of the post-registration automatic parking control is not satisfied, the CPU makes a "No" determination at step 1325, and proceeds to step 1395 to tentatively terminate the present routine.

In contrast, when the execution condition of the post-registration automatic parking control is satisfied, the CPU makes a "Yes" determination at step 1325, and proceeds to step 1330. At step 1330, the CPU starts the above-described post-registration automatic parking control for moving/parking the vehicle SV automatically into/at the registered parking position specified by the information which has been stored in the non-volatile memory. Thereafter, the CPU proceeds to step 1335 to set the value of the flag Xauto to "1". Furthermore, the CPU proceeds to step 1340 to determine whether or not the vehicle SV has reached the registered parking position.

When the vehicle SV has not reached the registered parking position, the CPU makes a "No" determination at step 1340, and proceeds to step 1395 to tentatively terminate the present routine.

In contrast, when the vehicle SV has reached the registered parking position, the CPU makes a "Yes" determination at step 1340, and proceeds to step 1345 to set the value of the flag Xauto to "0". Thereafter, the CPU proceeds to step 1395 to tentatively terminate the present routine.

It should be noted that when the value of the flag Xauto is not "0" (i.e., the value of the flag Xauto is "1") at a time point at which the CPU executes a process of step 1310, the CPU makes a "No" determination at step 1310 to directly proceed to step 1340. Thereby, the post-registration automatic parking control is continued.

Although the embodiment of the present invention has been specifically described, the present invention is not limited to the above-mentioned embodiment, and various modified examples based on the technical idea within the scope of the present invention can be adopted. For example, the embodiment of the present invention may be configured to be provided with a voice recognition device (not shown). In this case, some or all of the operations using the touch panel can be replaced with the voice operations of the user recognized by the voice recognition device.

What is claimed is:

1. A parking support apparatus comprising:
an imaging device configured to take a picture of a peripheral area of a vehicle to obtain image data;
an instruction device configured to instruction signals based on operations performed by a driver of said vehicle, wherein said instruction device includes a touchscreen that displays a first display image including a parking start instruction button that said driver operates and a second display image including an execution button that said driver operates;
a control device configured to perform an automatic parking control to automatically move said vehicle to a target parking position based on said image data and thereafter set said vehicle to a parking state; and
a memory device configured to store information specifying a parking position as a registered parking position in advance,
wherein,
said control device is configured:
to perform, when a first instruction signal of said instruction signals from said instruction device is received based on said driver operating said parking start instruction button, said automatic parking control and cause said memory device to store information specifying a first determination position, as said registered parking position, said first determination position being determined based on a position of said vehicle of a time point at which said vehicle is set to said parking state through said automatic parking control; and
to perform, when a second instruction signal of said instruction signals from said instruction device is received based on said driver operating said execution button, said automatic parking control using, as said target parking position, said registered parking position specified by said information stored in said memory device.

2. The parking support apparatus according to claim 1, wherein,
said touchscreen displays a third display image including a registration process start button that said driver operates; and
said control device is configured, when a third instruction signal of said instruction signals from said instruction device is received based on said driver operating said registration process start button;
to recognize, as a reference position, a position of said vehicle of a parking state set time point at which said vehicle is set to a parking state after said vehicle is moved by a driving operation of said driver; and
to cause said memory device to store information specifying a second determination position, as said registered parking position, said second determination position being determined based on said reference position.

3. The parking support apparatus according to claim 2, wherein,
said control device is configured, when said third instruction signal is received, to recognize, as said reference position, a position of said vehicle of a shift time point at which a shift position of a shift lever is changed from a shift position other than a parking position to said parking position, said shift time point being regarded as said parking state set time point.

4. The parking support apparatus according to claim 1, wherein,
said control device is configured, when said first instruction signal is received:
to obtain feature point information including positional information of a three-dimensional object present on a road surface around of said vehicle based on said image data obtained in a period between a start time point of said automatic parking control and a completion time point of said automatic parking control; and
to store said feature point information in said memory device with relating said feature point information to said first determining position; and
said control device is further configured, when said second instruction signal is received:
to obtain said feature point information as actual feature point information based on said image data; and
to perform said automatic parking control based on said feature point information stored in said memory device and said actual feature point information.

5. The parking support apparatus according to claim 4, wherein,
said control device is configured to accept said second instruction signal, when said vehicle is determined to be present in the vicinity of a position specified by said stored information in said memory device as said registered parking position, based on said image data.

6. The parking support apparatus according to claim 1, wherein,
said touchscreen displays a fourth display image; and
said control device is configured:
to cause, after said first instruction signal is received, said touchscreen to display said fourth display image including:
a peripheral image showing surroundings of said vehicle of said time point at which said vehicle is set to said parking state through said automatic parking control;
a registration intended position display frame indicative of a position of said vehicle of said time point at which said vehicle is set to said parking state through said automatic parking control;
a registration button that said driver operates; and
a position operation button that said drive operates,
to cause said touchscreen to change a display position of said registration intended position display frame in said peripheral image in accordance with an operation to said position operation button, when said position operation button is operated; and
to cause said memory device to store information specifying a parking position corresponding to said display position of said registration intended position display frame in said peripheral image, as said registered parking position, when said registration button is operated.

7. A parking support apparatus comprising:
a camera configured to take a picture of a peripheral area of a vehicle to obtain image data;
a touchscreen configured to transmit instruction signals based on operations performed by a driver of said vehicle, wherein said touchscreen displays a first display image including a parking start instruction button configured to be operated by said driver and a second display image including an execution button configured to be operated by said driver;
an electronic control unit (ECU) including at least one processor programmed to:
perform an automatic parking control to automatically move said vehicle to a target parking position based on said image data and thereafter set said vehicle to a parking state; and
store information specifying a parking position as a registered parking position in advance,
wherein said ECU is programmed to:
when a first instruction signal of said instruction signals from said touchscreen is received based on said driver operating said parking start instruction button, perform said automatic parking control and store information specifying a first determination position, as said registered parking position, said first determination position being determined based on a position of said vehicle of a time point at which said vehicle is set to said parking state through said automatic parking control; and
when a second instruction signal of said instruction signals from said touchscreen is received based on said driver operating said execution button, perform said automatic parking control using, as said target parking position, said registered parking position specified by said stored information.

* * * * *